(12) United States Patent
Nguyen et al.

(10) Patent No.: US 11,238,657 B2
(45) Date of Patent: Feb. 1, 2022

(54) AUGMENTED VIDEO PROTOTYPING

(71) Applicant: Adobe Inc., San Jose, CA (US)

(72) Inventors: Cuong D. Nguyen, San Francisco, CA (US); Paul J. Asente, Redwood City, CA (US); Germán Ariel Leiva, Buenos Aires (SA); Rubaiat Habib Kazi, Seattle, WA (US)

(73) Assignee: Adobe Inc., San Jose, CA (US)

( * ) Notice: Subject to any disclaimer, the term of this patent is extended or adjusted under 35 U.S.C. 154(b) by 130 days.

(21) Appl. No.: 16/806,612

(22) Filed: Mar. 2, 2020

(65) Prior Publication Data

US 2021/0272363 A1    Sep. 2, 2021

(51) Int. Cl.
| | |
|---|---|
| *G06T 19/00* | (2011.01) |
| *H04N 5/262* | (2006.01) |
| *H04N 5/272* | (2006.01) |
| *G06T 7/20* | (2017.01) |
| *G11B 27/036* | (2006.01) |
| *G06T 13/20* | (2011.01) |

(52) U.S. Cl.
CPC .......... *G06T 19/006* (2013.01); *G06T 7/20* (2013.01); *G06T 13/20* (2013.01); *G11B 27/036* (2013.01); *H04N 5/2621* (2013.01); *H04N 5/272* (2013.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 2009/0157478 A1* | 6/2009 | Yang | ...................... | G06Q 30/02 705/7.29 |
| 2020/0197825 A1* | 6/2020 | Bear | ...................... | H04N 7/157 |

OTHER PUBLICATIONS

Ayora Berry; "Prototyping methods for augmented reality;" medium.com; pp. 1-17; https://medium.com/@ayoraberry/prototyping-methods-for-augmented-reality-4b7687863423 (Year: 2019).*

"6 VR and Ar Statistics: Shaping the Future of Augmented Reality with Data", https://www.newgenapps.com/blog/6-vr-and-ar-statistics-shaping-the-future-of-augmented-reality-with-data, Jan. 1, 2018, 12 pages.

(Continued)

*Primary Examiner* — Peter Hoang
(74) *Attorney, Agent, or Firm* — FIG. 1 Patents

(57) ABSTRACT

In implementations of augmented video prototyping, a mobile device records augmented video data as a captured video of a recorded scene in an environment, the augmented video data including augmented reality tracking data as 3D spatial information relative to objects in the recorded scene. A video prototyping module localizes the mobile device with reference to the objects in the recorded scene using the 3D spatial information for the mobile device being within boundaries of the recorded scene in the environment. The video prototyping module can generate an avatar for display that represents the mobile device at a current location from a perspective of the recorded scene, and create a spatial layer over a video frame at the current location of the avatar that represents the mobile device. The spatial layer is an interactive interface on which to create an augmented reality feature that displays during playback of the captured video.

20 Claims, 22 Drawing Sheets

(56) References Cited

OTHER PUBLICATIONS

"Augmented Reality—The Past, the Present and the Future", Retrieved at https://www.interaction-design.org/literature/article/augmented-reality-the-past-the-present-and-the-future, Aug. 27, 2019, 6 pages.
"List of top Augmented Reality Companies—Crunchbase", Retrieved at: https://www.crunchbase.com/hub/augmented-reality-companies—on Oct. 14, 2019, 6 pages.
Alce,"WozARd: A Wizard of Oz Method for Wearable Augmented Reality Interaction—A Pilot Study", Jun. 2015, 11 pages.
Arora,"SymbiosisSketch: Combining 2D & 3D Sketching for Designing Detailed 3D Objects in Situ", Apr. 21, 2018, 15 pages.
Bae,"EverybodyLovesSketch: 3D Sketching for a Broader Audience", Proceedings of the 22nd annual ACM symposium on User interface software and technology, Oct. 2009, 10 pages.
Bardram,"Virtual Video Prototyping of Pervasive Healthcare Systems", Jan. 2002, 13 pages.
Beaudouin-Lafon,"Prototyping Tools and Techniques", Jan. 1, 2002, pp. 1006-1031.
Carter,"How is User Interface Prototyping Really Done in Practice? A Survey of User Interface Designers", Sep. 2010, pp. 207-211.
Chen,"Remote Paper Prototype Testing", Apr. 18, 2015, 4 pages.
Davis,"K-Sketch: A 'kinetic' sketch pad for novice animators", Apr. 10, 2008, 11 pages.
Dow,"Wizard of Oz Interfaces for Mixed Reality Applications", Apr. 2, 2005, 4 pages.
Fiala,"ARTag, a fiducial marker system using digital techniques", Jun. 20, 2005, 7 pages.
Flarup,"Designing for Augmented Reality", Retrieved at https://www.youtube.com/watch?v=-r1VtYxvVlc, Jul. 24, 2018, 1 page.
Green,"The Rapid Development of User Interfaces: Experience with the Wizard of Oz Method", Oct. 1985, 5 pages.
Guven,"Authoring 3D Hypermedia for Wearable Augmented and Virtual Reality", Jan. 2003, 10 pages.
Guven,"Mobile Augmented Reality Interaction Techniques for Authoring Situated Media on-Site", Oct. 2006, 3 pages.
Hartmann,"Authoring Sensor-based Interactions by Demonstration with Direct Manipulation and Pattern Recognition", Aug. 29, 2007, 10 pages.
Henderson,"Evaluating the Benefits of Augmented Reality for Task Localization in Maintenance of an Armored Personnel Carrier Turret", Oct. 19, 2009, pp. 135-144.
Henderson,"Exploring the Benefits of Augmented Reality Documentation for Maintenance and Repair", Oct. 2011, pp. 1355-1368.
Jansson,"Design Fixation", Jan. 1991, 9 pages.
Kato,"Marker Tracking and HMD Calibration for a Video-based Augmented Reality Conferencing System", In Proceedings. 2nd IEEE and ACM International Workshop on Augmented Reality, Oct. 20, 1999, 10 pages.
Kazi,"Kitty: Sketching Dynamic and Interactive Illustrations", Oct. 5, 2014, pp. 395-405.
Kazi,"Motion Amplifiers: Sketching Dynamic Illustrations Using the Principles of 2D Animation", May 7, 2016, 11 pages.
Kim,"miniStudio: Designers' Tool for Prototyping Ubicomp Space with Interactive Miniature", May 2016, pp. 213-224.
Kim,"SketchStudio: Experience Prototyping with 2.5-Dimensional Animated Design Scenarios", Jun. 9, 2018, pp. 831-843.
Kwan,"Mobi3DSketch: 3D Sketching in Mobile AR", May 2, 2019, 11 pages.
Landay,"Interactive Sketching for the Early Stages of User Interface Design", Jul. 22, 1994, 19 pages.
Ledo,"Astral: Prototyping Mobile and Smart Object Interactive Behaviours Using Familiar Applications", Jun. 2019, pp. 711-724.
Ledo,"Evaluation Strategies for HCI Toolkit Research", Apr. 21, 2018, 17 pages.
Leiva,"Enact: Reducing Designer-Developer Breakdowns when Prototyping Custom Interactions", Jul. 2019, 48 pages.
Leiva,"Montage: A Video Prototyping System to Reduce Re-Shooting and Increase Re-usability", Dec. 28, 2018, 9 pages.
Li,"SweepCanvas: Sketch-based 3D Prototyping on an RGB-D Image", Oct. 2017, pp. 387-399.
Luciani,"Empowering Non-Designers Through Animation-based Sketching", Oct. 2017, 9 pages.
MacIntyre,"DART: A Toolkit for Rapid Design Exploration of Augmented Reality Experiences", Oct. 2004, 10 pages.
Mackay,"Using Video to Support Interaction Design", Jan. 2002, 42 pages.
Mackay,"Video Brainstorming and Prototyping: Techniques for Partifipatory Design", May 1999, 2 pages.
Mackay,"Video Prototyping: a technique for developing hypermedia systems", Apr. 13, 1988, 3 pages.
Maudet,"Design Breakdowns: Designer-Developer Gaps in Representing and Interpreting Interactive Systems", Oct. 10, 2017, 13 pages.
Mohr,"Retargeting Video Tutorials Showing Tools With Surface Contact to Augmented Reality", May 2017, 13 pages.
Nebeling,"360proto: Making Interactive Virtual Reality & Augmented Reality Prototypes from Paper", Jul. 19, 2019, 13 pages.
Nebeling,"The Trouble with Augmented Reality/Virtual Reality Authoring Tools", Oct. 2018, 5 pages.
Nuernberger,"SnapToReality: Aligning Augmented Reality to the Real World", May 7, 2016, 12 pages.
Rettig,"Prototyping for Tiny Fingers", Apr. 1994, 10 pages.
Saquib,"Interactive Body-Driven Graphics for Augmented Video Performance", Feb. 2, 2019, 13 pages.
Seichter,"ComposAR: An Intuitive Tool for Authoring AR Applications", Sep. 2008, 3 pages.
Tognazzini,"The "Starfire" Video Prototype Project: A Case History", Apr. 1994, 7 pages.
Vistisen,"Return of the Vision Video—Can corporate vision videos serve as setting for participation?", Jan. 2017, 10 pages.
Wellner,"Interacting with paper on the DigitalDesk", Mar. 1994, 107 pages.
Xia,"A Survey on Human Performance Capture and Animation", May 2017, 19 pages.
Xiao,"WorldKit: Rapid and Easy Creation of Ad-hoc Interactive Applications on Everyday Surfaces", Apr. 2013, 10 pages.
"TikTokAR Filters", LENSLIST.CO [retrieved 2021-11-16], Retrieved from the Internet Khttps://lenslist.co/tiktok-ar-filters/>., 3 Pages.
Hall, Chris , "What is Google Maps AR navigation and Live View and how do you use it?", Pocket-lint [online][retrieved Dec. 15, 2021], Retrieved from the Internet <https://www.pocket-lint.com/apps/news/google/147956-what-is-google-maps-ar-navigation-and-how-do-you-use-it>., May 10, 2021, 15 pages.

* cited by examiner

AUGMENTED VIDEO PROTOTYPING

BACKGROUND

Generally, augmented reality (AR) applications refer to interactive interfaces and techniques used to develop and augment a real-world environment with virtual content, such as with 3D generated graphics, texts, images, and the like onto the physical environment. Designing and prototyping are typical functions of an AR application development process. The design process generally involves designers, user-experience researchers, clients, and project managers expressing and communicating their design ideas about how an AR application should look and function. However, the prototyping aspect needed to create an AR application generally requires designers with an in-depth knowledge of advanced programming and 3D modeling skills, which can be overly cumbersome and stifle creativity.

Notably, a designer can incur significant development time and effort to design and prototype the features and animations of an AR application. Some conventional design applications attempt to simplify some of the AR authoring and prototyping, such as by abstracting some of the programming tasks with simple interactive user interface functions. These abstractions, however, are still programmatic and require an AR designer to have some knowledge of advanced programming, as well as 3D modeling skills to fully develop a prototype of an AR application. Even more limiting, these conventional design applications are designed to be used with 2D inputs (e.g., with a mouse, a keyboard, or touch inputs) rather than using 3D spatial AR interactions that a designer may want to incorporate into an AR application design. Many of the primary authoring and development tasks in the AR design process, such as for 3D object placement and manipulation, can be quite tedious when attempting to accomplish the tasks in only a 2D design environment.

SUMMARY

This Summary introduces features and concepts of augmented video prototyping, which is further described below in the Detailed Description and shown in the Figures. This Summary should not be considered to describe essential features of the claimed subject matter, nor used to determine or limit the scope of the claimed subject matter.

Aspects of augmented video prototyping are described. In implementations, a mobile device includes a camera device that records augmented video data as a captured video of a recorded scene in an environment, the augmented video data including augmented reality (AR) tracking data as 3D spatial information relative to objects in the recorded scene. The mobile device implements a video prototyping module that can localize the mobile device with reference to the objects in the recorded scene using the 3D spatial information responsive to the mobile device being moved within the boundaries of the scene in the environment. The video prototyping module can generate an avatar for display over a video frame showing the recorded scene, where the avatar represents the mobile device at a current location from the perspective of the recorded scene of the environment. The video prototyping module can track relative locations in the video frames of the mobile device in the recorded scene of the environment using the 3D spatial information as the video frames are displayed, and the avatar is displayable over the video frames to represent the mobile device at respective locations in the recorded scene of the environment.

The video prototyping module can also create a spatial layer over the video frame at the current location of the avatar that represents the mobile device in the recorded scene of the environment, where the spatial layer is an interactive interface on which to create an augmented reality feature that displays during playback of the captured video. Similar to the avatar that represents the mobile device, the spatial layer can be localized with reference to the objects in the video frame of the recorded scene using the 3D spatial information. In implementations, an augmented reality feature, such as any type of a sketch, image, animation, 3D model, etc. can be associated with the spatial layer at the current location of the spatial layer in the video frame of the recorded scene. Additionally, the avatar that represents the mobile device can be linked or associated with the spatial layer, and then as a user moves the mobile device, the spatial layer moves along a motion path according to the movements of the mobile device for a 3D manipulation of the augmented reality feature that is created on and associated with the spatial layer.

The video prototyping module can record the movements of the spatial layer as animation actions, and the recorded movements translate to the animation actions that are applied to the augmented reality feature, which can then be displayed as an animation during playback of the captured video. The video prototyping module can map the spatial layer timing and positioning of the augmented reality feature to one or more of the video frames of the captured video, and the augmented reality feature displays as the animation during playback of the video frames of the captured video.

In other aspects of augmented video prototyping, an augmented reality feature of a spatial layer can be assigned to an animation feature of another spatial layer that is used to guide animation of the augmented reality feature. As noted above, the spatial layer can be created at the current location of the avatar that represents the mobile device in the video frame of the recorded scene. An additional spatial layer can then be created over the video frame at a different location of the avatar that represents the mobile device in the recorded scene. The video prototyping module can receive an input of a motion path sketch on the additional spatial layer, and the augmented reality feature of the spatial layer is assigned to the motion path sketch on the additional spatial layer. The augmented reality feature then displays as an animation that moves according to the motion path sketch during playback of the captured video.

BRIEF DESCRIPTION OF THE DRAWINGS

Implementations of augmented video prototyping are described with reference to the following Figures. The same numbers may be used throughout to reference similar features and components that are shown in the Figures.

DETAILED DESCRIPTION

Figure 1:
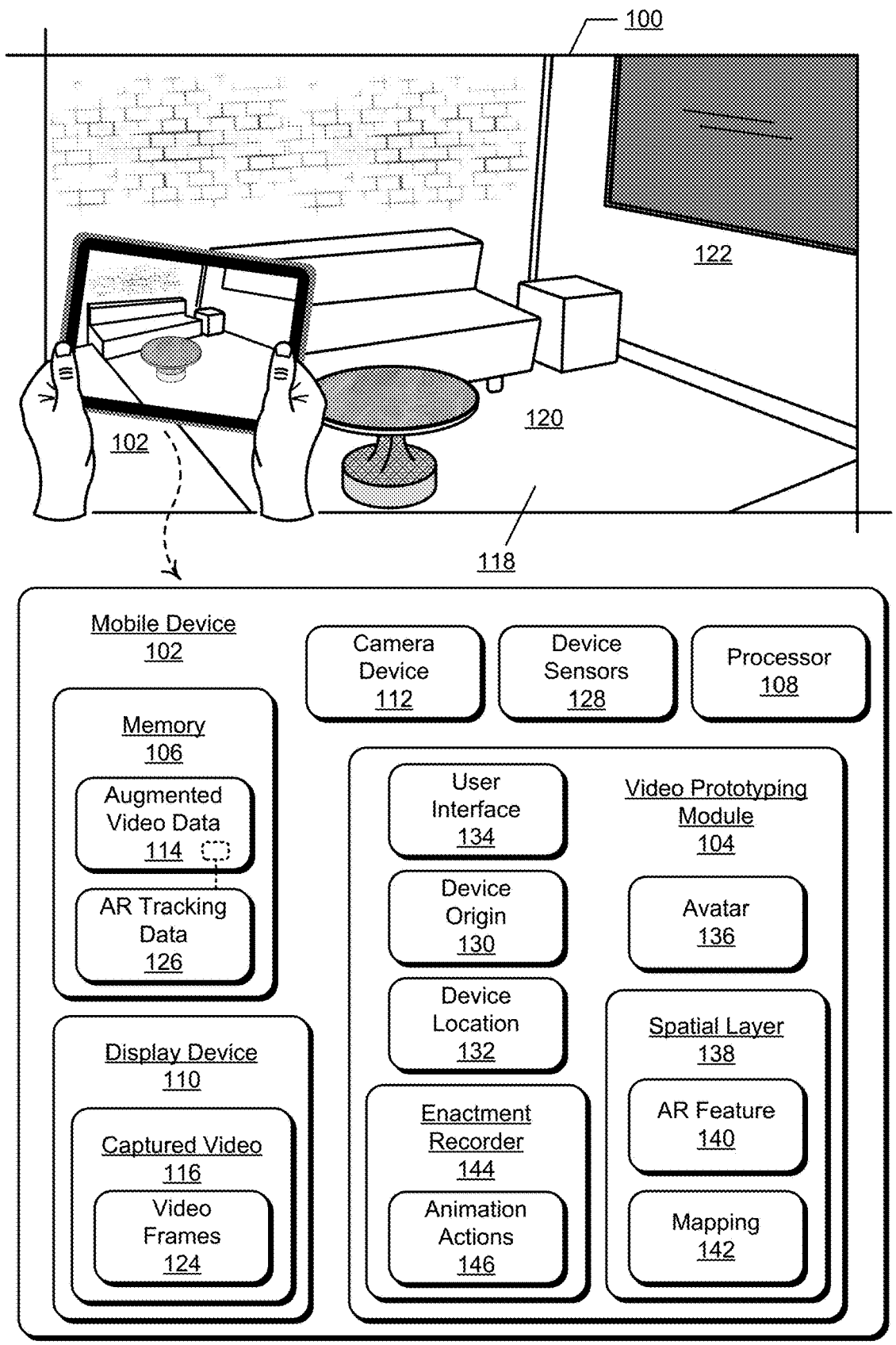
FIG. 1 illustrates an example mobile device in an example environment in which aspects of augmented video prototyping can be implemented.

Implementations of augmented video prototyping are described, and provide techniques for rapidly prototyping augmented reality (AR) features and animations over augmented video data of a captured video. The techniques described herein for augmented video prototyping allow non-technical AR designers (e.g., those without advanced programming and 3D modeling skills) to quickly develop and animate augmented reality design ideas. Generally, the expertise needed as a designer with an in-depth knowledge of advanced programming and 3D modeling skills to design an AR application can significantly slow the design process. Further, a designer having to think about abstract technical programming and modeling concepts, rather than about the overall design and animation features, does not lend to an ideal user experience. Notably, designers and other artistic creatives are more effective when they can work directly with the design medium, which in this case is in the AR environment.

The features of augmented video prototyping described herein enable designers to capture video with a camera of a mobile device, such as with a tablet device or other similar computing device that has a camera, and edit the video directly on the same mobile device that captures the video. The mobile device can include a video prototyping module, which implements the features and aspects of augmented video prototyping as described herein. The video prototyping module includes a user interface that displays on the mobile device, and through which a user of the device can initiate to record and capture the video, as well as quickly develop and animate augmented reality design ideas that are displayable over the captured video as the video is played back for viewing.

Generally, video prototyping is significantly less complicated than having to edit computer code to design and model an AR application. Further, the augmented reality interactions via the user interface of the video prototyping module are more intuitive for a designer who develops 3D manipulation tasks and animates an augmented reality feature, rather than trying to configure the same animation tasks in a 2D programmatic interface. Notably, the features of augmented video prototyping combine the benefits of both video prototyping and AR authoring into a cohesive AR video prototyping system. Further, the features of augmented video prototyping use 3D positioning to create spatial layers over video frames of the captured video, rather than using conventional 2D interaction techniques to draw animations over the video frames. The techniques described for augmented video prototyping include augmented video recording, creating spatial layers over the captured video, and an enactment recorder of the video prototyping module that allows a user to develop and animate augmented reality features using the same device as was used to capture the video.

As noted above, a user with a mobile device, which also has a camera, can utilize the device to implement the features of augmented video recording, such as to capture a video recording with synchronized AR data. The user can initiate use of the camera to record augmented video data as a captured video of a recorded scene in an environment, such as outdoors, indoors, in a room, etc. As described in more detail below, individual video frames of the captured video can be sequentially displayed and/or displayed as individual still images on the display of the mobile device for augmented video prototyping. The augmented video data that is recorded as the captured video includes AR tracking data as 3D spatial information relative to objects in the recorded scene of the environment, as well as 3D spatial information relative to the position of the camera device (i.e., in the mobile device) while the augmented video data is being recorded. With this unique recording of the augmented video data and the synchronized AR data, a user of the mobile device can develop and animate augmented reality features using both familiar 2D interactions, such as a video frame timeline and sketches, as well as intuitive and spatial AR interactions having six-degree-of-freedom manipulations for 3D augmented prototyping.

The techniques for augmented video prototyping include creating spatial layers over the captured video. A spatial layer allows a designer to develop and animate augmented reality features that will be displayable over the captured video during playback of the video for viewing. A spatial layer can display images and graphics on a 3D canvas, and an augmented reality feature can be composited onto the augmented video recording similar to placing a 3D object onto a live AR scene. However, in implementations of augmented video prototyping, the design and animation of the augmented reality feature occurs in an affine manner on the recorded video feed, transforming and mapping the spatial layer to preserve coordinates, lines, planes, and geometric relations in the 3D space. Thus, the designer has more control of the resulting composition and manipulation of the augmented reality features as 3D objects.

Generally, with the use of spatial layers created and mapped to the captured video, being able to create and animate augmented reality features over the video has several unique advantages for a designer. These advantages include ideation, which provides that the video can be frozen to display individual video frames on which to create an AR experience, allowing the designer to explore and iterate different ideas on the same experience as an essential aspect of the design process. Another advantage is being able to provide an intuitive understanding of depth perception when developing and animating an augmented reality feature over the captured video. For designers using conventional design techniques, knowing how far a virtual object (e.g., an augmented reality feature) is relative to the AR device is a common problem with creating and developing animated AR features. However, with augmented video prototyping, the designer can intentionally capture a video with multiple complementary angles to view and adjust the rendering of the augmented reality feature as a virtual object with respect to the captured scene. Additionally, from the standpoint of collaboration, video is a natural format for collaborative review and feedback, and the designer can quickly export the video and send it to another collaborator for input and feedback on an AR prototype.

In implementations of augmented video prototyping, the enactment recorder allows a designer to create and develop animation over the captured video. Notably, the animation of an augmented reality feature can be created by manipulating a spatial layer directly, such as by changing its transformation and appearance, or indirectly through a sketch-based interface. For direct manipulation of a spatial layer, the user of the mobile device can "grab" the spatial layer using the mobile device and move it around in the recorded scene of the environment. The transformation of the movement in 3D space (as six-degrees-of-freedom movement) can be recorded as a motion path, which allows the designer to express complex motion trajectory in a more intuitive manner than with a traditional, spline-based interface. Through the user interface of the video prototyping module, the user can also adjust the size and appearance of a spatial layer, such as the opacity of the layer and a cropping mask. For an indirect manipulation of the spatial layer, the user of the mobile device can assign a virtual object (e.g., an augmented reality feature) to a pre-defined motion path to define the animation of the augmented reality feature. A user can create the pre-defined motion path on another spatial layer either by creating a new sketch on the spatial layer or by importing a motion path, for example from an image file.

These animation recordings can then be mapped to the augmented video utilizing the AR tracking data and a timeline of the video frames to create the animation of an augmented reality feature in the video space. The features of augmented video prototyping allow a designer to mockup an AR experience by creating and animating an augmented reality feature that can then be mapped to individual video frames of the captured video, in a sense, "freezing" the video and developing layered interactions over the video to prototype augmented video in an AR environment While features and concepts of augmented video prototyping can be implemented in any number of different devices, systems, networks, environments, and/or configurations, implementations of augmented video prototyping are described in the context of the following example devices, systems, and methods.

FIG. 1 illustrates an example environment 100 in which aspects of augmented video prototyping can be implemented. The example environment 100 includes a mobile device 102, which implements features of a video prototyping module 104 for augmented video prototyping, as described herein. The mobile device 102 can be implemented as any type of computing device, client device, mobile phone, tablet device, communication, entertainment, gaming, media playback, and/or other type of electronic and/or computing device. In this example environment 100, the mobile device 102 may include any number and combination of different components as further described with reference to the example device shown in FIG. 33. For example, the mobile device 102 includes a memory 106 and a processor 108, as well as a display device 110 and a camera device 112 used to record video.

The mobile device 102 implements the video prototyping module 104, which may be implemented as a module that includes independent processing, memory, and/or logic components functioning as a computing and/or electronic device integrated with the mobile device 102. Alternatively or in addition, the video prototyping module 104 can be implemented in software, in hardware, or as a combination of software and hardware components. In this example, the video prototyping module 104 is implemented as a software application or modules, such as executable software instructions (e.g., computer-executable instructions) that are executable with a processing system (e.g., the processor 108) of the mobile device 102 to implement the described techniques of augmented video prototyping. As a software application or module, the video prototyping module 104 can be stored in memory of the device (e.g., in the device memory 106), or in any other suitable memory device or electronic data storage implemented with the video prototyping module. Alternatively or in addition, the video prototyping module 104 may be implemented in firmware and/or at least partially in computer hardware. For example, at least part of the video prototyping module 104 may be executable by a computer processor, and/or at least part of the video prototyping module may be implemented in logic circuitry.

The camera device 112 of the mobile device 102 can be used to record augmented video data 114 as a captured video 116 of a scene 118 in the example environment 100. For example, the mobile device 102 is shown as a tablet device with a camera used to record the video of the scene 118, which is a room with several objects 120, such as a table, a stool, couches, etc., as well as a television or other similar type of media display device 122. The augmented video data 114 is recorded by the camera device 112 and can be stored in the device memory 106, as well as displayed as the captured video 116 on the display device 110 of the mobile device. Notably, as described in more detail below, individual video frames 124 of the captured video 116 can be sequentially displayed and/or displayed as individual still images on the display device 110 of the mobile device for augmented video prototyping.

In implementations, the augmented video data 114 includes augmented reality (AR) tracking data 126 as 3D spatial information relative to the objects 120 in the captured video 116 of the recorded scene 118, as well as relative to the position of the camera device 112 (i.e., in the mobile device 102) while the augmented video data 114 is being recorded. The 3D spatial information can be captured along with the augmented video data 114 from a changing user viewpoint, to encompass different perspectives of the scene 118 in the environment 100. The mobile device 102 can be enabled with an augmented reality framework, and the synchronized AR tracking data 126 can be obtained from already developed data tracking systems and/or determined from the video processing pipeline, such as based on optical flow and surface reconstruction. The mobile device 102 includes device sensors 128, such as may be implemented as components of an inertial measurement unit (IMU). The device sensors 128 can be implemented with various sensors, such as a gyroscope, an accelerometer, and/or other types of motion and location sensors to sense motion of the device at a particular location. The device sensors 128 can generate sensor data vectors having three-dimensional parameters (e.g., rotational vectors in x, y, and z-axis coordinates) indicating location, position, acceleration, rotational speed, and/or orientation of the device.

Generally, the device sensors 128 can include hardware sensors that gather data used by the video prototyping module 104 to establish a device origin 130 when the mobile device 102 is used to record the augmented video data 114 as the captured video 116 of the recorded scene 118 in the example environment 100. As a user moves the mobile device 102 within the boundaries of the captured video 116 of the recorded scene 118, the video prototyping module 104 can use the 3D spatial information of the AR tracking data 126 to localize the mobile device 102 with reference to the objects 120 in a video frame 124 of the recorded scene, and determine current and subsequent device locations 132 within the boundaries of the scene 118 of the environment.

Figure 2:
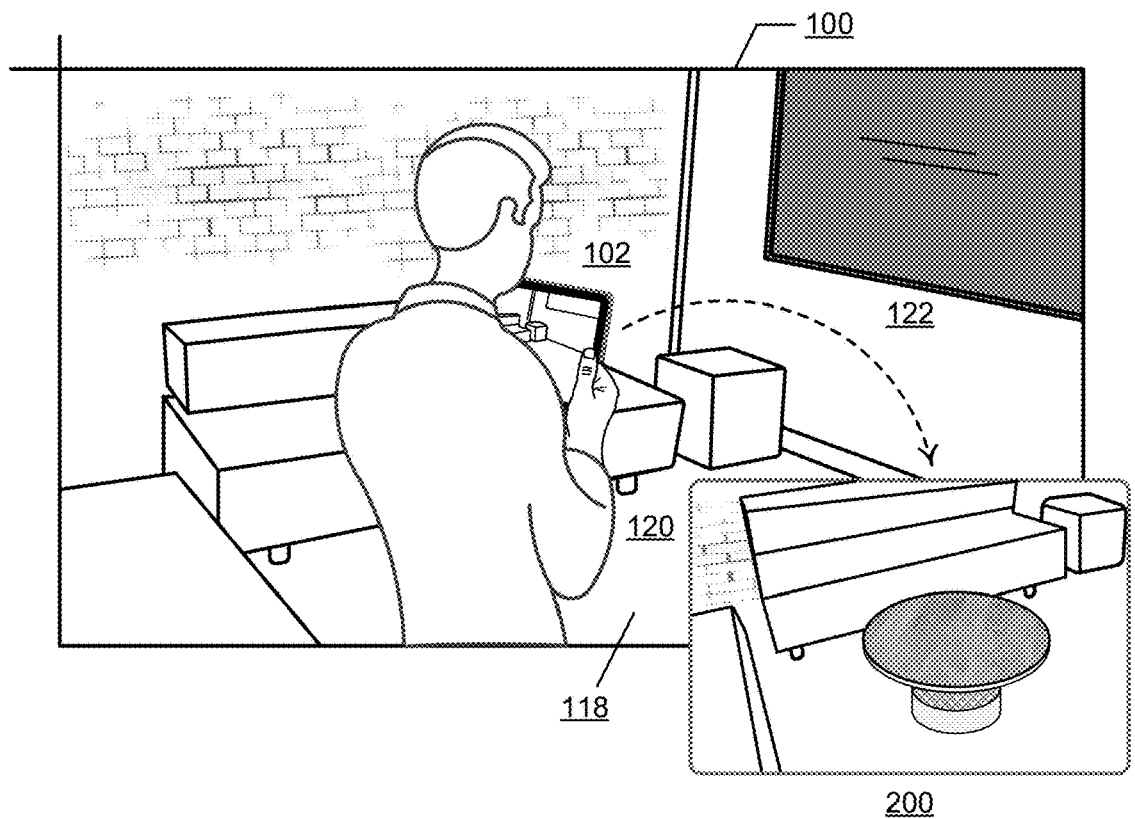
FIGS. 2-4 illustrate examples of recording augmented video data as captured video in implementations of augmented video prototyping.
Figure 3:
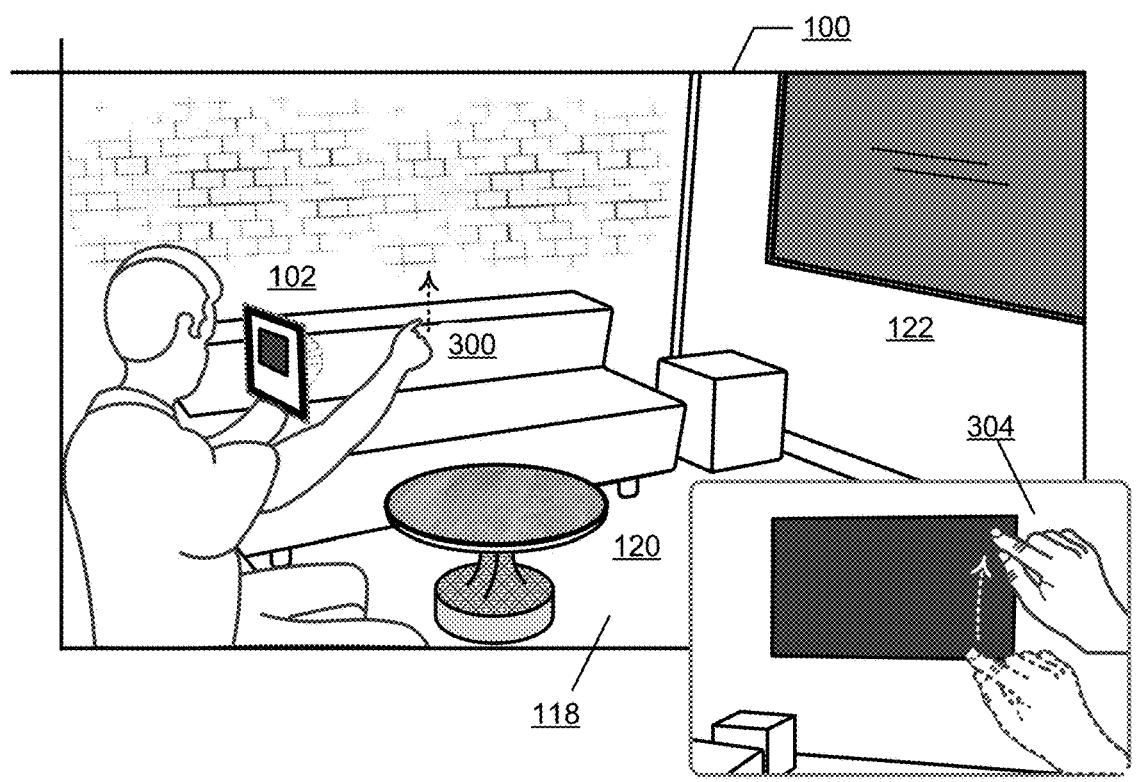
Figure 4:
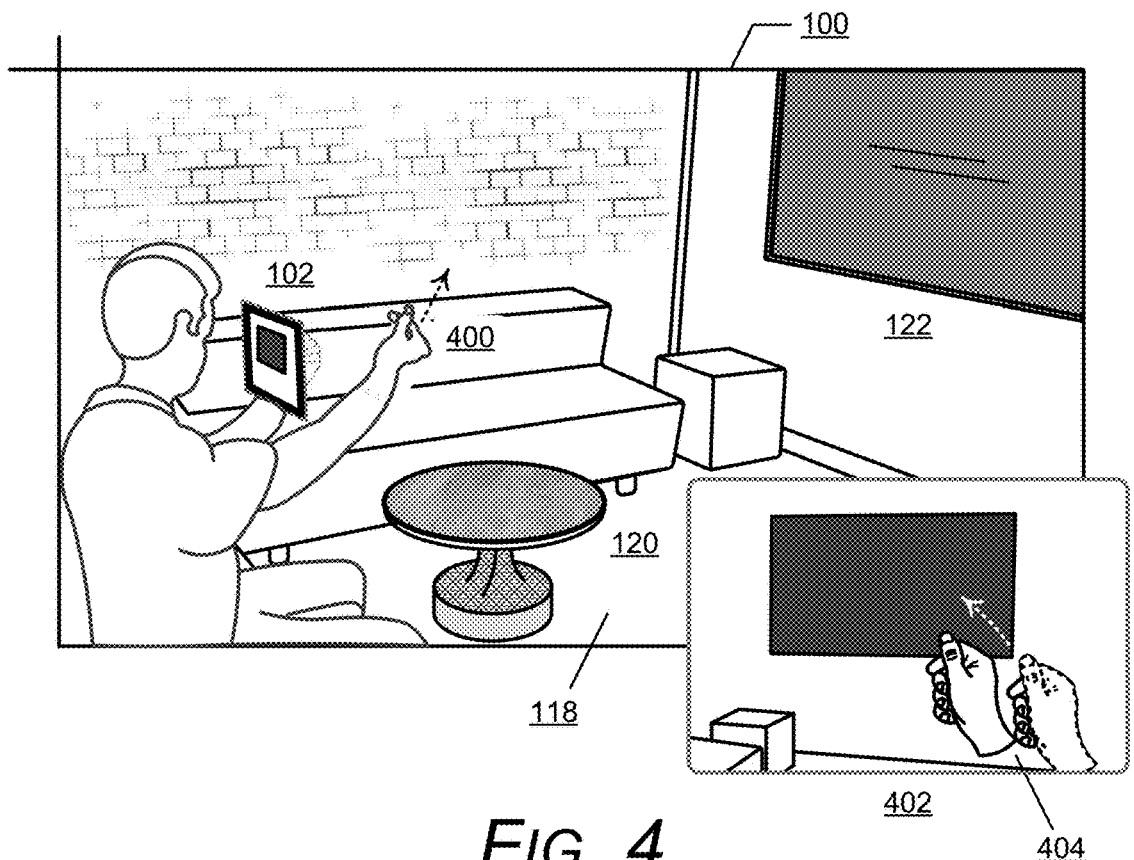

FIGS. 2-4 further illustrate the camera device 112 of the mobile device 102 being used to record the augmented video data 114 as the captured video 116 of the recorded scene 118 in the example environment 100. For example, as shown in FIG. 2, a user who is holding the mobile device 102 and recording the video moves the mobile device into the scene 118 of the environment, generally toward the table. A camera view 200 of the video that is being recorded by the camera device 112 is also shown for perspective, and shows what the user who is holding the mobile device 102 can see while recording the video. Although the user in the environment is blocking a view of the table (e.g., one of the objects 120 in the scene 118), the camera view 200 shows that the table, as well as the other objects in the scene, are being recorded as the captured video 116.

Similarly, as shown in FIG. 3, the user who is holding the mobile device 102 and recording the video is shown sitting on a couch within the scene 118 of the environment 100. In this example, the user is adding a gesture 300 that will later correspond to an animation feature added to the video for augmented video prototyping. As shown in a camera view 302 of the video that is being recorded by the camera device 112, the user records a swipe-up gesture 304 across the media display device 122 as part of the recording of the captured video 116. Next, as shown in FIG. 4, the user continues recording the video and adds another gesture 400 that will also correspond to another animation feature added to the video for augmented video prototyping. As shown in a camera view 402 of the video that is being recorded by the camera device 112, the user records a movement gesture 404 towards the media display device 122 as part of the recording of the captured video 116.

Returning to the discussion of FIG. 1, the video prototyping module 104 implemented by the mobile device 102 includes a user interface 134, via which the user can interact with the device for augmented video prototyping of the captured video 116. As illustrated and described above with reference to FIGS. 2-4, the captured video is recorded as the augmented video data 114 of the recorded scene 118 in the example environment 100. The augmented video data 114 includes the AR tracking data 126 that provides 3D spatial information of the position of the camera device 112 (i.e., in the mobile device 102) relative to the objects 120 in the captured video 116 of the recorded scene 118. The video prototyping module 104 can also generate an avatar 136 as a representation of the mobile device 102, which can be displayed in the recorded scene of the captured video. The avatar 136 is a visualization of the current position of the mobile device 102 in the environment 100 as the user moves the mobile device around in the environment after the captured video 116 is recorded.

Figure 5:
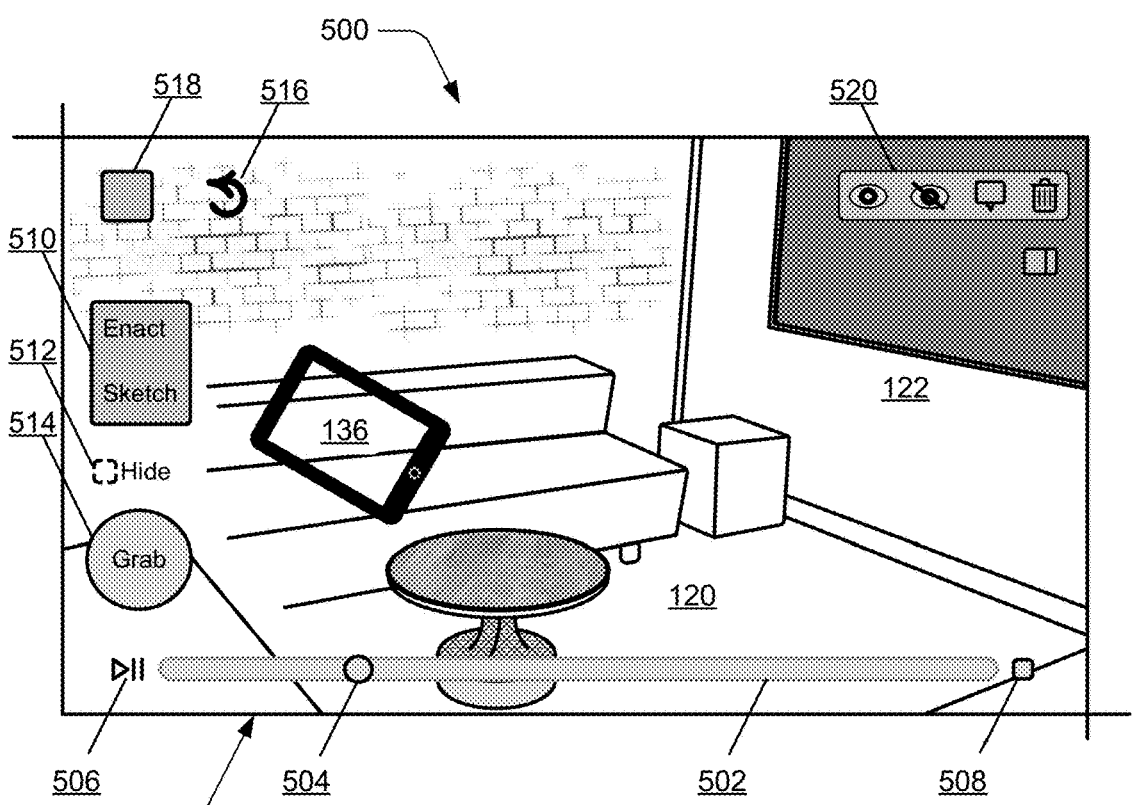
FIG. 5 illustrates an example user interface of a video prototyping module which can be used to implement aspects of augmented video prototyping.

FIG. 5 illustrates an example 500 of the user interface 134 for the video prototyping module 104, via which the user of the mobile device 102 can interact with the video frames 124 of the captured video 116 for augmented video prototyping. In this example, the user interface 134 is shown in a playback view, which includes a playback timeline 502 with a frame locator 504 that indicates the portion of the captured video 116 being displayed in the playback view as one of the video frames 124. As noted above, the individual video frames 124 of the captured video 116 can be sequentially displayed with a play-pause control 506 and/or displayed as individual still images utilizing a stop control 508 on the display device 110 of the mobile device 102 in the playback view of the user interface 134 for augmented video prototyping.

The user interface 134 in this example 500 also includes a sketch-enact control 510 that the user can select to create a spatial layer in a video frame 124 of the captured video 116 of the recorded scene 118 in the environment. As described in more detail below, a representation of the mobile device 102 can be displayed as the avatar 136 in the recorded scene of the captured video, and a spatial layer can be created at the position of the device representation in a video frame of the video. The avatar 136 is a visualization of the current position of the mobile device 102 in the environment 100 as the user moves the mobile device around in the environment. The user interface 134 includes a hide-show control 512 that the user can toggle to either display the avatar 136 as the visual representation of the mobile device in the environment, or hide the display of the avatar.

The user interface 134 also includes a grab-drop control 514 that the user can select to initiate moving a spatial layer that has been created corresponding to the user moving the mobile device 102 in the environment. The user interface 134 has an undo selector 516, as well as a color selector 518 that initiates a color selection palette when selected by the user. The user interface 134 also includes animation control features 520 that are selectable by the user of the mobile device 102 to animate when a spatial layer appears and disappears, as well as orientation and deletion of the layer. Each of these user interface controls are described in more detail below with reference to the examples of augmented video prototyping shown and described in FIGS. 6-29.

Returning to the discussion of FIG. 1, the video prototyping module 104 implemented by the mobile device 102 can be used to generate a spatial layer 138 at the current location of the avatar 136 that represents the mobile device 102 in a video frame 124 of the recorded scene 118. A spatial layer 138 can display images and graphics on a 3D canvas (e.g., similar to a canvas in Photoshop™), and is rendered on 3D plane primitives, where an augmented reality feature can be composited onto the augmented video recording similarly to placing a 3D object onto a live AR scene. A spatial layer can also define the position and orientation of a 3D model. For example, 3D text can be placed in space on the spatial layer, or a dimensional sign could be positioned so that its front is aligned with the spatial layer. However, in implementations of augmented video prototyping, the design and animation of the augmented reality feature 140 occurs in an affine manner on the recorded video feed, transforming and mapping the spatial layer 138 to preserve coordinates, lines, planes, and geometric relations in the 3D space.

As further described below with reference to the examples shown in the figures, the spatial layer 138 is an interactive interface on which to create an augmented reality feature 140 that displays during playback of the captured video 116. Similar to the avatar 136 that represents the mobile device, a spatial layer 138 can be localized with reference to the objects 120 in the video frame 124 of the recorded scene 118 using the 3D spatial information in the AR tracking data 126. Generally, the spatial layer 138 can be created and a mapping 142 is used to localize the spatial layer in the video frame, and subsequent video frames 124, as the position of the spatial layer changes relative to the video frames during playback of the captured video 116. Notably, a spatial layer 138 can be used to develop, create, insert, and/or animate any type of media, such as sketches, images, 3D models, animated models, and the like. Additionally, the augmented reality feature 140 as any type of the media can be associated with the spatial layer by the video prototyping module.

The video prototyping module 104 also includes an enactment recorder 144, which can be utilized by the user of the device to initiate animation actions 146 of an augmented reality feature 140 that has been created on a spatial layer 138. The enactment recorder 144 can be initiated from the user interface 134 by user selection of the sketch-enact control 510. The enactment recorder 144 can be implemented so that the user of the mobile device 102 can create and develop animation over the captured video 116. Notably, the animation of an augmented reality feature 140 can be created by manipulating a spatial layer 138 directly, such as by changing its transformation and appearance, or indirectly through a sketch-based interface. For direct manipulation of a spatial layer 138, the user of the mobile device 102 can "grab" (or attach) the spatial layer using the mobile device and moving it around in the recorded scene 118 of the environment 100. The transformation of the movement in 3D space (as six-degrees-of-freedom movement) can be recorded as an animation action 146 (e.g., a motion path), which allows the user to develop complex motion trajectory in an intuitive manner.

Through the user interface 134 of the video prototyping module 104, the user can also adjust the size and appearance of a spatial layer 138, such as the opacity of the layer and a cropping mask. For an indirect manipulation of the spatial layer 138, the user of the mobile device 102 can assign an augmented reality feature 140 to a pre-defined motion path to define the animation of the augmented reality feature. A user can create the pre-defined motion path on another spatial layer either by creating a new sketch on the spatial layer or by importing a motion path, for example from an image file. The recordings of the animation actions 146 can then be mapped to the augmented video data 114 utilizing the AR tracking data 126 and a timeline of the video frames 124 to create the animation of an augmented reality feature 140 in the video space. The features of augmented video prototyping allow a designer to mockup an AR experience by creating and animating an augmented reality feature 140 that can then be mapped to individual video frames 124 of the captured video 116.

Figure 6:
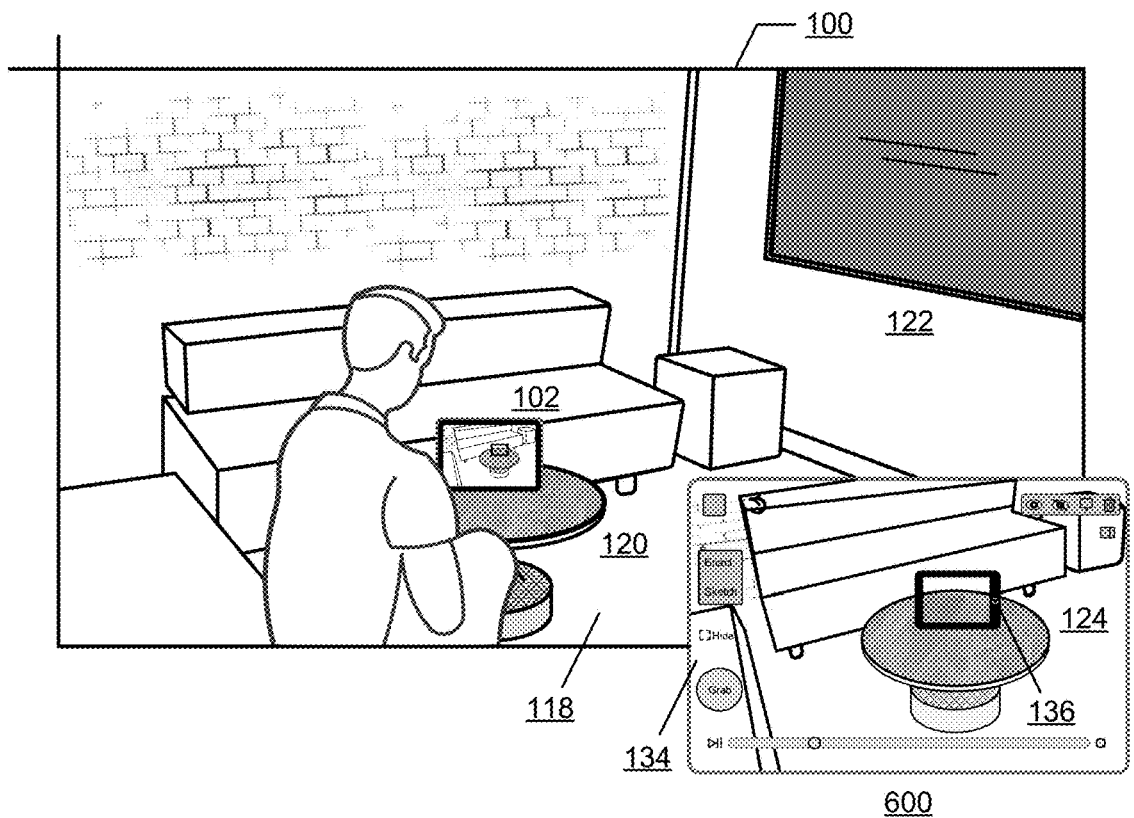
FIGS. 6-11 illustrate an example of creating and adding an augmented reality feature that is displayable during playback of the captured video in aspects of augmented video prototyping.

FIGS. 6-11 illustrate the mobile device 102 being used to add an augmented reality feature that is displayable during playback of the captured video 116. For example, as shown in FIG. 6, a user of the mobile device 102 moves the device into the scene 118 of the environment 100 and holds the device on the table (e.g., one of the objects 120 in the environment). The video prototyping module 104 can localize the mobile device 102 with reference to the objects 120 in the video frame 124 of the recorded scene using the 3D spatial information of the AR tracking data 126 responsive to the mobile device being moved within the boundaries of the scene 118 in the environment. This reflects the 3D experience by changing the camera position with respect to the timeline of the video frames 124 of the video. In this example, the video frame 124 of the scene generally corresponds to the camera view 200 of the video that is being recorded by the user with the camera device 112 of the scene shown in FIG. 2, with a closer view of the table. A design view 600 of the user interface 134 of the video prototyping module 104 is also shown for perspective in FIG. 6, and shows the user interface over a video frame 124 of the captured video 116, which is what the user who is holding the mobile device 102 sees on the device.

The design view 600 also displays the avatar 136 that is generated by the video prototyping module 104 for display over the video frame 124 of the recorded scene 118 in the environment 100. As shown in this example, the avatar 136 represents the mobile device 102 at the current location of the device in the recorded scene of the captured video 116, which in this instance, is on the table. The video prototyping module 104 can track the relative locations of the mobile device 102 in the video frames 124 of the recorded scene 118 in the environment 100 using the 3D spatial information of the AR tracking data 126 as the video frames are displayed, and the avatar 136 is displayable over the video frames to represent the mobile device at locations in the respective video frames of the captured video.

Figure 7:
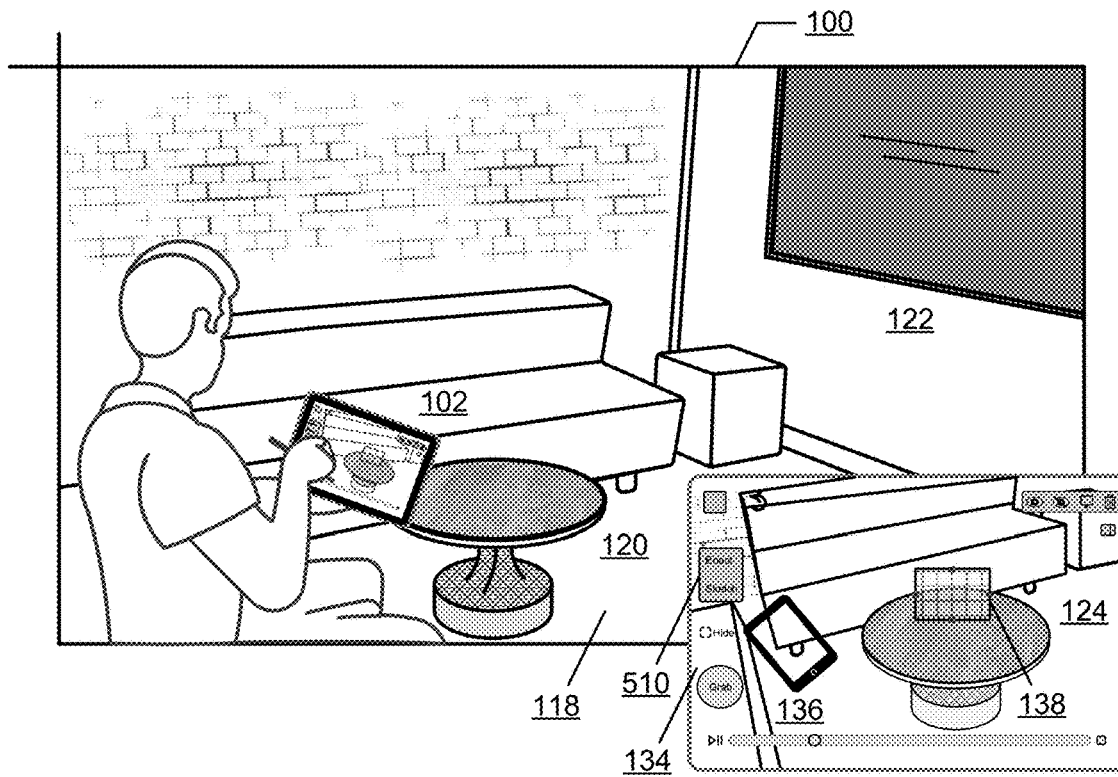

The user of the mobile device 102 can then initiate creating a spatial layer 138 over the video frame 124 at the current location of the avatar 136 that represents the mobile device 102 in the recorded scene 118 of the environment. As shown in FIG. 7 in a design view 700 of the user interface 134 of the video prototyping module 104, the user interface 134 includes the sketch-enact control 510 that the user can select to create the spatial layer 138 over the video frame 124 of the captured video 116 of the recorded scene 118 in the environment. The video prototyping module 104 can create the spatial layer 138 over the video frame at the current location of the avatar 136 (i.e., on the table in FIG. 6) that represents the mobile device in the scene 118 of the environment 100.

The spatial layer 138 is an interactive interface on which to create an augmented reality feature that displays during playback of the captured video. Similar to the avatar 136 that represents the mobile device 102, the spatial layer 138 can be localized with reference to the objects of the scene shown in the video frame 124 using the 3D spatial information of the AR tracking data 126. As further shown in FIG. 7, the user can pick up and move the mobile device 102 for augmented video prototyping after initiating the spatial layer 138 being created to appear on the table in the video frame. Notably, the relative position of the avatar 136 has moved in the design view 700, corresponding to the current location of the mobile device 102 in the scene of the environment, where the user has picked up and moved the mobile device.

Figure 8:
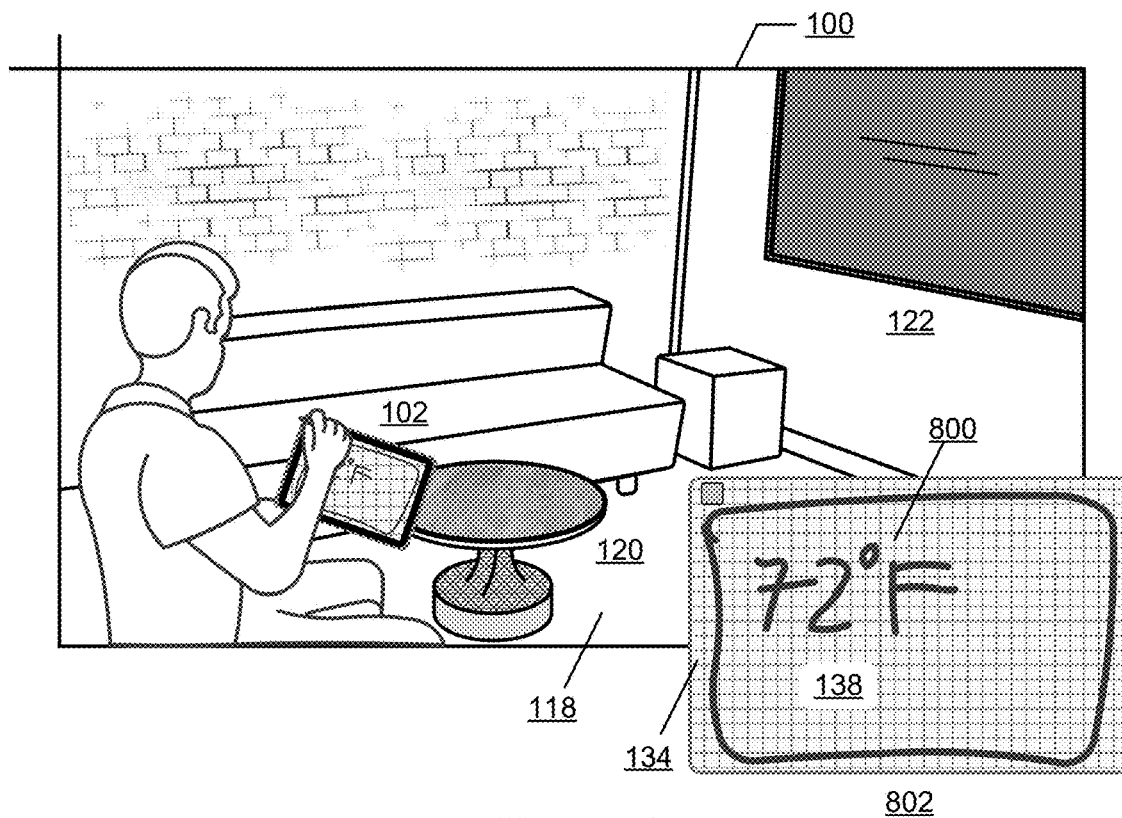

FIG. 8 illustrates an augmented reality feature 800 being sketched on the user interface 134 of the video prototyping module 104, as also shown in a design view 802, which shows what the user who is holding the mobile device 102 sees on the device. For example, the user who is sitting in the environment 100 can initiate the sketch mode of the video prototyping module 104, such as by user selection of the sketch-enact control 510 in the user interface 134. The user of the mobile device 102 can then sketch the augmented reality feature 800 on the spatial layer 138 shown on the display of the device. In this example, the user of the mobile device is prototyping the augmented reality feature 800 as a simple display screen that displays the current temperature and an indication of the weather.

Figure 9:
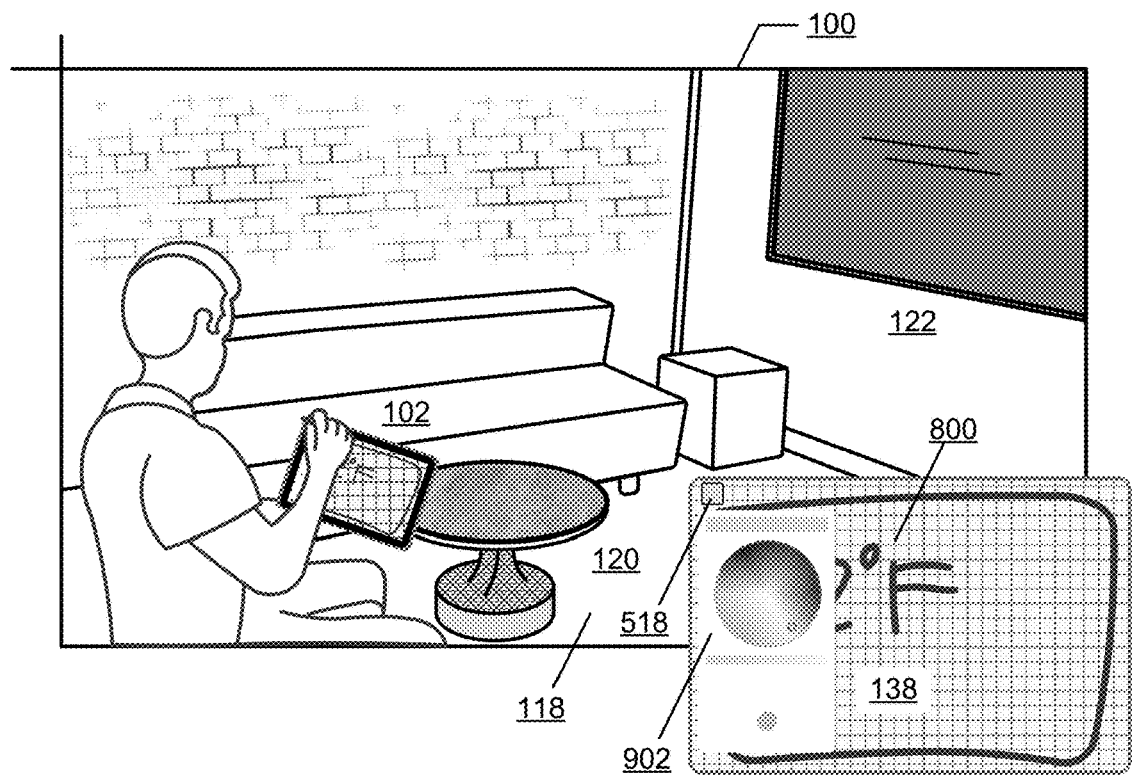

FIG. 9 further illustrates a color selection feature of the user interface 134 for the video prototyping module 104.

The user who is sitting in the environment 100 and sketching the augmented reality feature 800 on the spatial layer 138, as further shown in a design view 900, can select the color selector control 518 to initiate a drop-down display of a color selection palette 902 from which the user can select and/or change sketch colors. Although shown in grayscale in the figure, the color selection palette 902 is representative of a full range of colors that can be selected and used in the sketch of the augmented reality feature.

Figure 10:
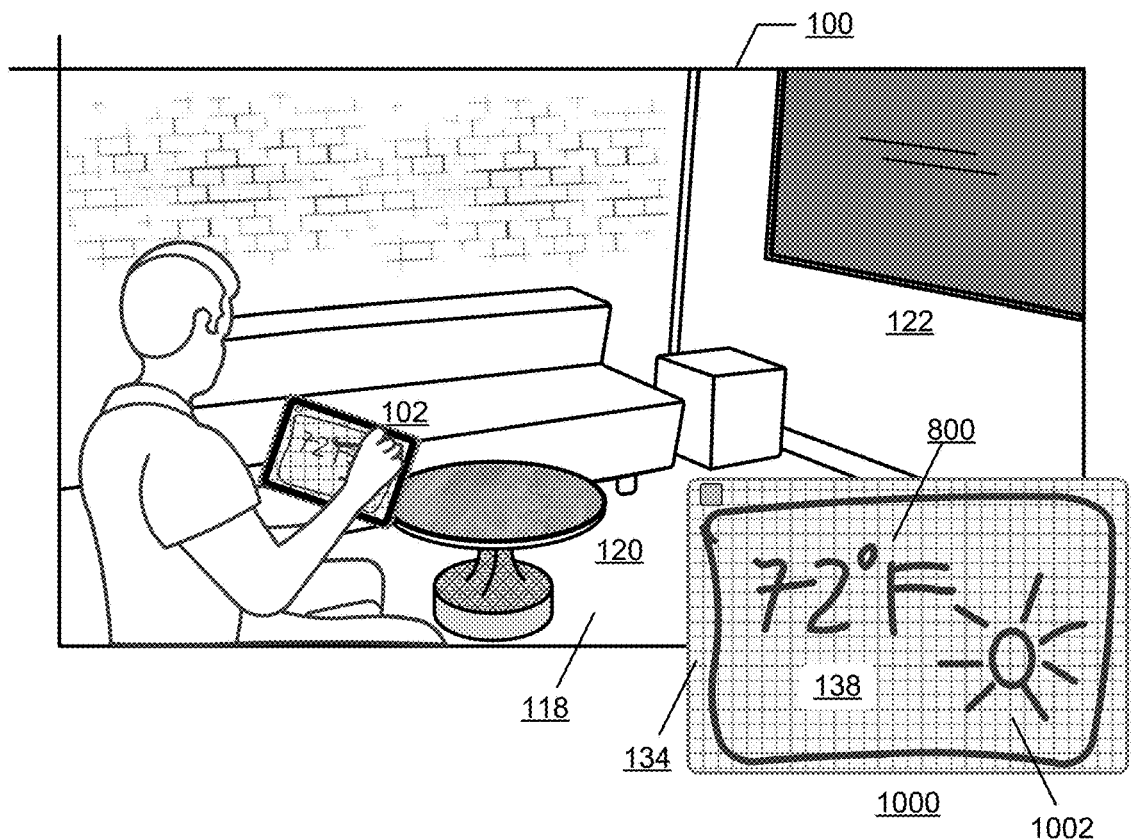

FIG. 10 further illustrates the augmented reality feature 800 being sketched on the user interface 134 of the video prototyping module 104, as also shown in a design view 1000, which shows what the user who is holding the mobile device 102 sees on the device. After selecting or changing sketch colors using the color selection palette 902, the user in this example adds the sketch feature 1002 to the augmented reality feature 800, as shown in the design view 1000.

Figure 11:
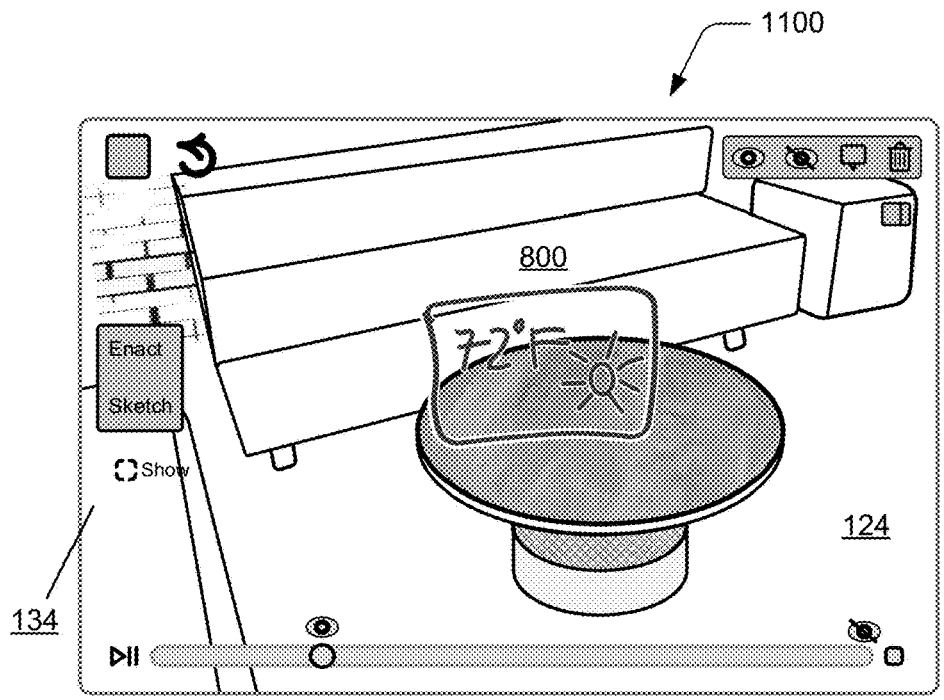

FIG. 11 illustrates an example 1100 of the completed prototype for the augmented reality feature 800, as shown in the user interface 134 of the video prototyping module 104 over the video frame 124 of the captured video 116. In this example, the augmented reality feature 800 is shown over the video frame at the position of the spatial layer 138, which in this instance, is on the table of the recorded scene captured in the video. During playback of the video frames 124 of the captured video 116, the augmented reality feature 800 will appear over the video during the closer views of the table, as previously recorded by the user with the camera device 112 of the mobile device 102. While FIGS. 8-10 illustrate the user creating the augmented reality feature using sketching, the video prototyping module 104 could also create the augmented reality feature by placing an image, a video, a 3D model, an animation, etc. on a spatial layer.

Figure 12:
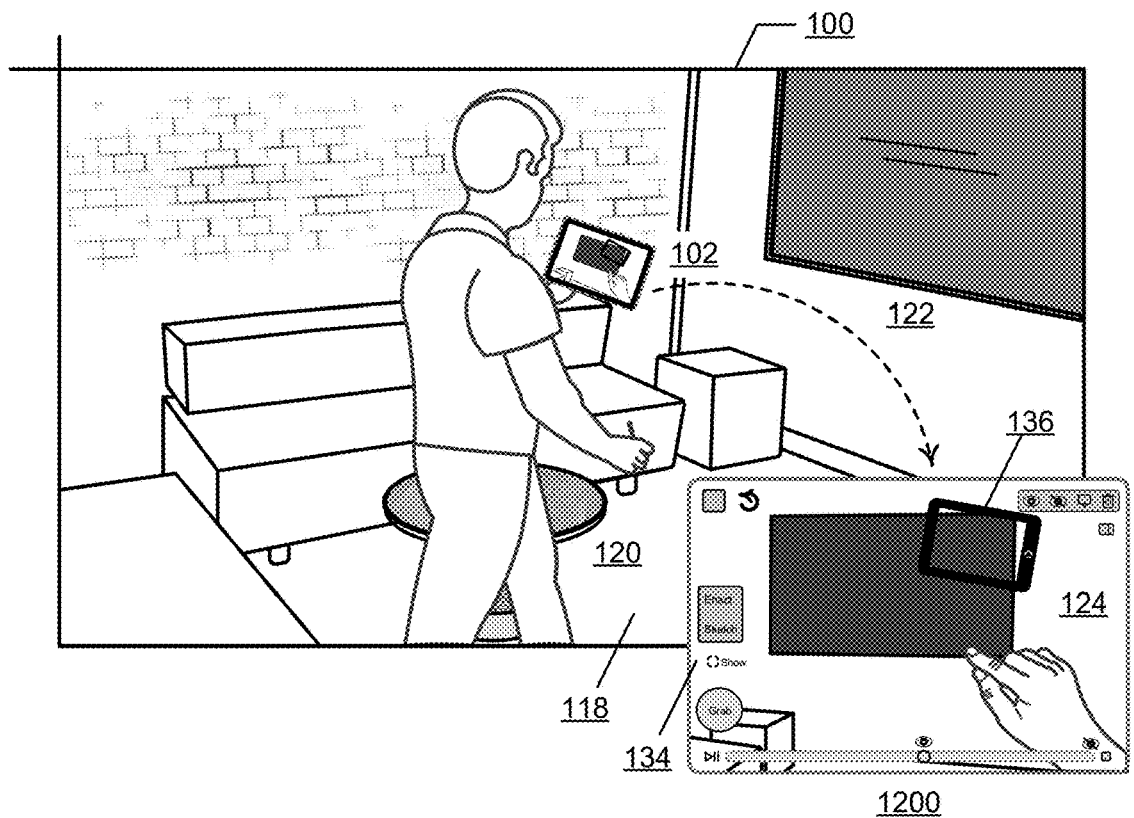
FIGS. 12-17 illustrate another example of creating and adding an augmented reality feature that is displayable with animation during playback of the captured video in aspects of augmented video prototyping.

FIGS. 12-17 illustrate the mobile device 102 being used to add another augmented reality feature that is displayable with animation during playback of the captured video 116. For example, as shown in FIG. 12, the user of the mobile device 102 moves the device within the scene 118 of the environment 100 and approaches the media display device 122. The video prototyping module 104 can localize the mobile device 102 with reference to the media display device 122 in the video frame 124 of the recorded scene using the 3D spatial information of the AR tracking data 126 responsive to the mobile device being moved within the boundaries of the scene 118 in the environment. In this example, the video frame 124 of the recorded scene generally corresponds to the camera view 302 of the video that is being recorded by the user with the camera device 112 of the scene shown in FIG. 3, with the user adding the swipe-up gesture 304 across the media display device 122. A design view 1200 of the user interface 134 of the video prototyping module 104 is also shown for perspective in FIG. 12, and shows the user interface over a video frame 124 of the captured video 116, which is what the user who is holding the mobile device 102 sees on the device.

The design view 1200 also displays the avatar 136 that is generated by the video prototyping module 104 for display over the video frame 124 of the recorded scene 118 in the environment 100. As shown in this example, the avatar 136 represents the mobile device 102 at the current location of the device in the recorded scene of the captured video 116, which in this instance, is approaching the media display device 122. The user of the mobile device 102 can then initiate to create a spatial layer 138 over the video frame 124 at the current location of the avatar 136 that represents the mobile device 102 in the scene 118 of the environment.

Figure 13:
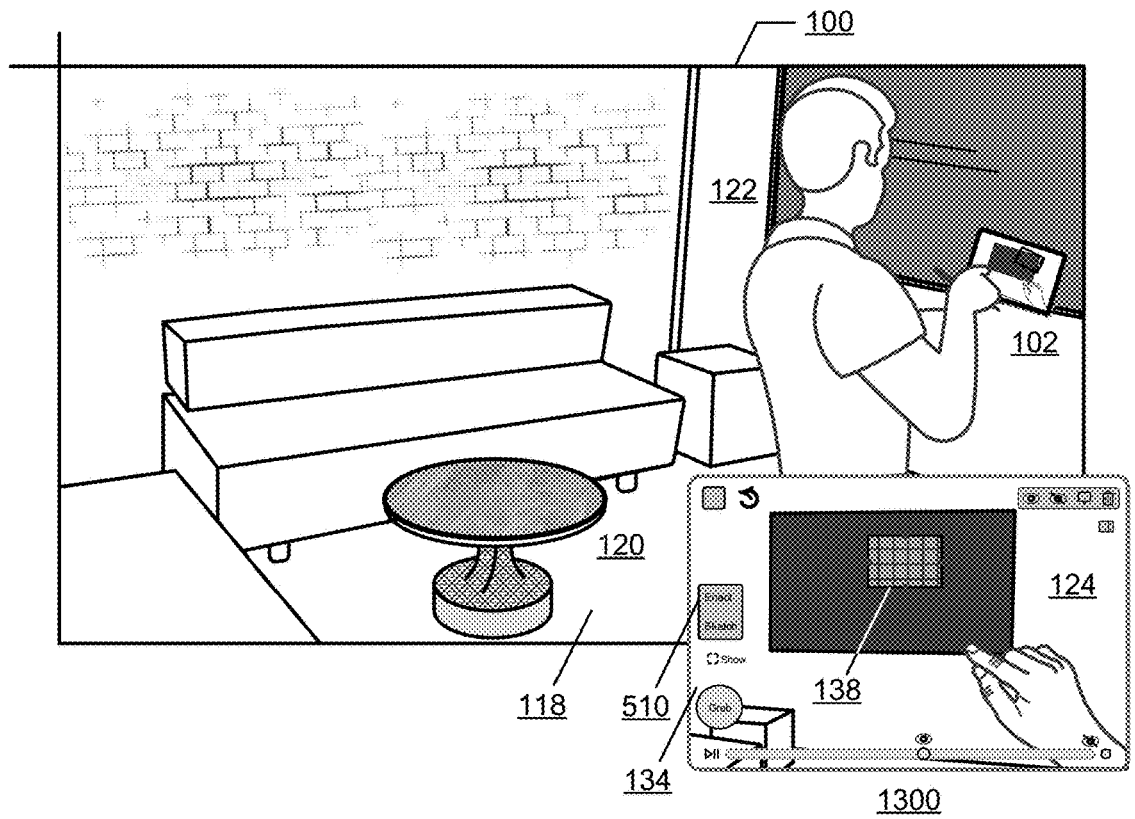
Figure 14:
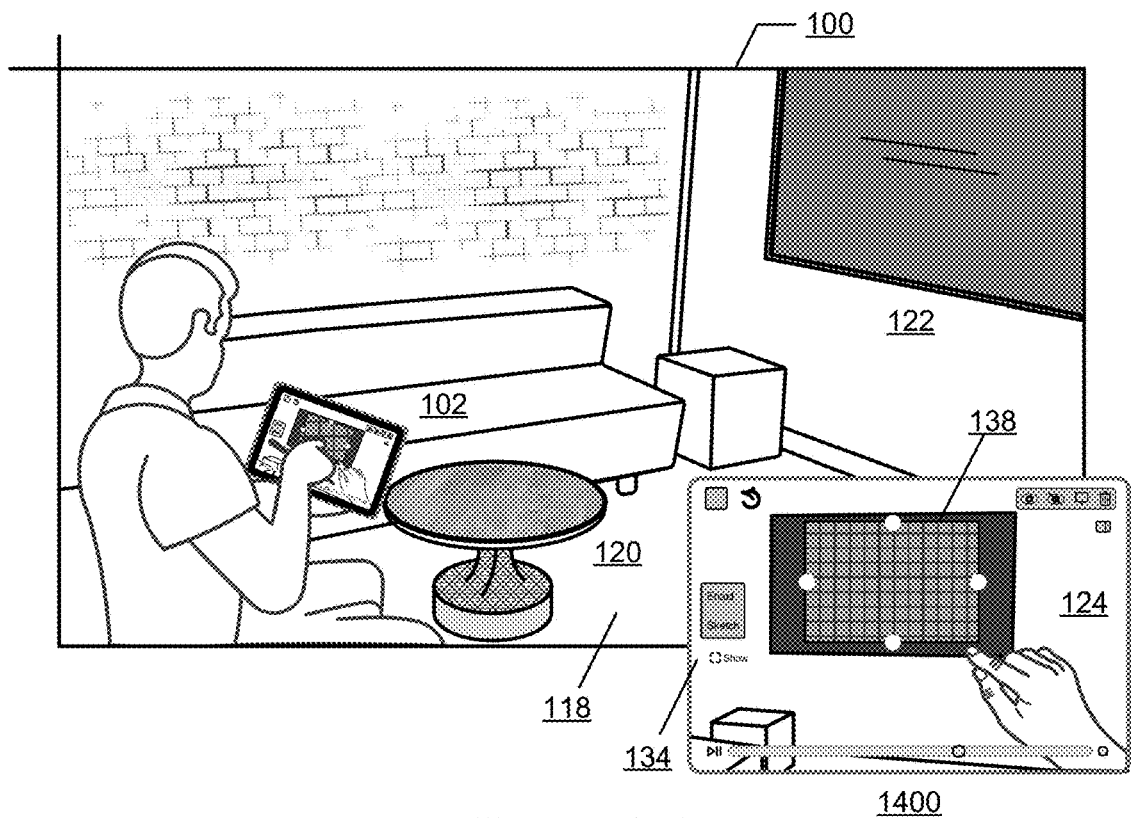

As shown in FIG. 13 in a design view 1300 of the user interface 134 of the video prototyping module 104, the user interface 134 includes the sketch-enact control 510 that the user can select to create the spatial layer 138 over the video frame 124 of the captured video 116 of the recorded scene 118 in the environment. The video prototyping module 104 can create the spatial layer 138 over the video frame at the current location of the avatar 136 (i.e., on the media display device 122) that represents the mobile device in the scene 118 of the environment 100. As noted above, the spatial layer 138 is an interactive interface on which to create an augmented reality feature that displays during playback of the captured video. As further shown in FIG. 14, the user can move the mobile device 102 for augmented video prototyping after initiating the spatial layer 138 being created to appear on the media display device 122. FIG. 14 also illustrates that the user can manipulate the size and shape of the spatial layer 138 on the user interface 134 of the video prototyping module 104, as also shown in a design view 1400, which shows what the user who is holding the mobile device 102 sees on the device.

Figure 15:
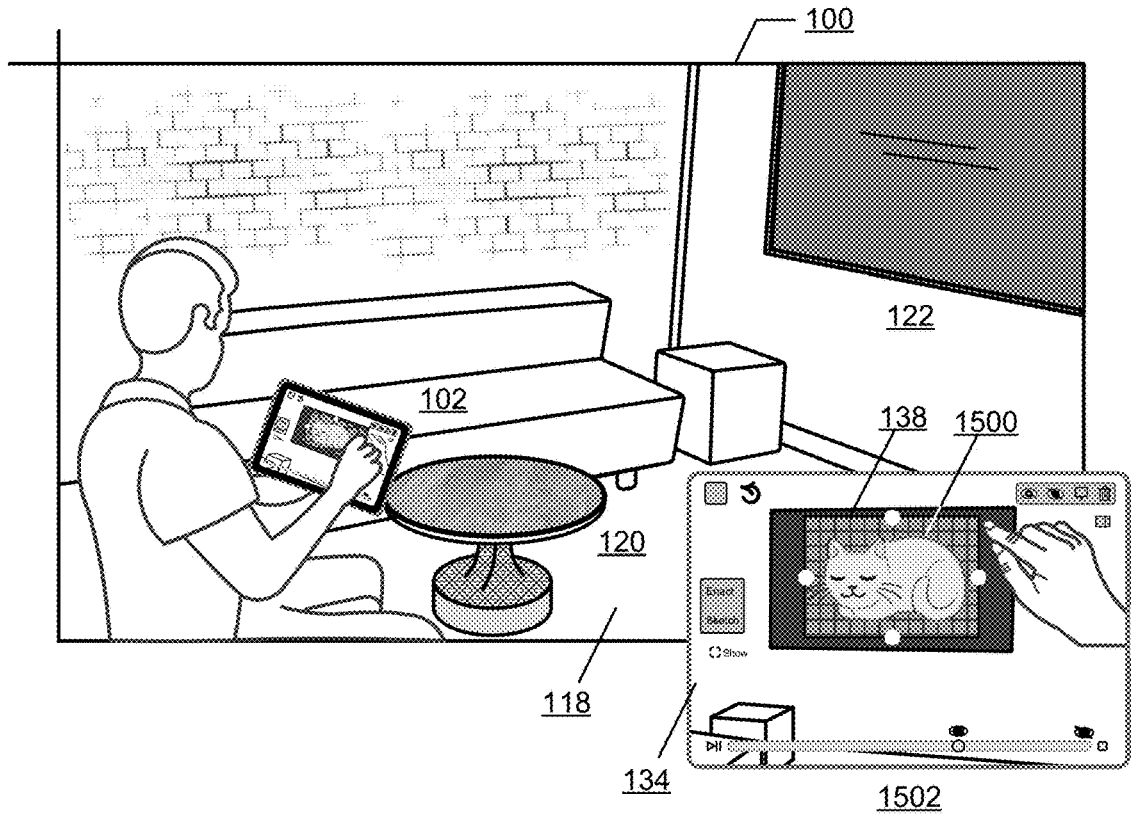

FIG. 15 illustrates an augmented reality feature 1500 being added as a graphic or image on the user interface 134 of the video prototyping module 104, as also shown in a design view 1502, which shows what the user who is holding the mobile device 102 sees on the device. For example, the user who is sitting in the environment 100 can insert the graphic or image via the user interface 134 of the video prototyping module 104. The user of the mobile device 102 can select and add the image as the augmented reality feature 1500 on the spatial layer 138 shown on the display of the device. In this example, the user of the mobile device is prototyping the augmented reality feature 1500 to appear as if the user turns on the media display device 122 to display the augmented reality feature 1500.

Figure 16:
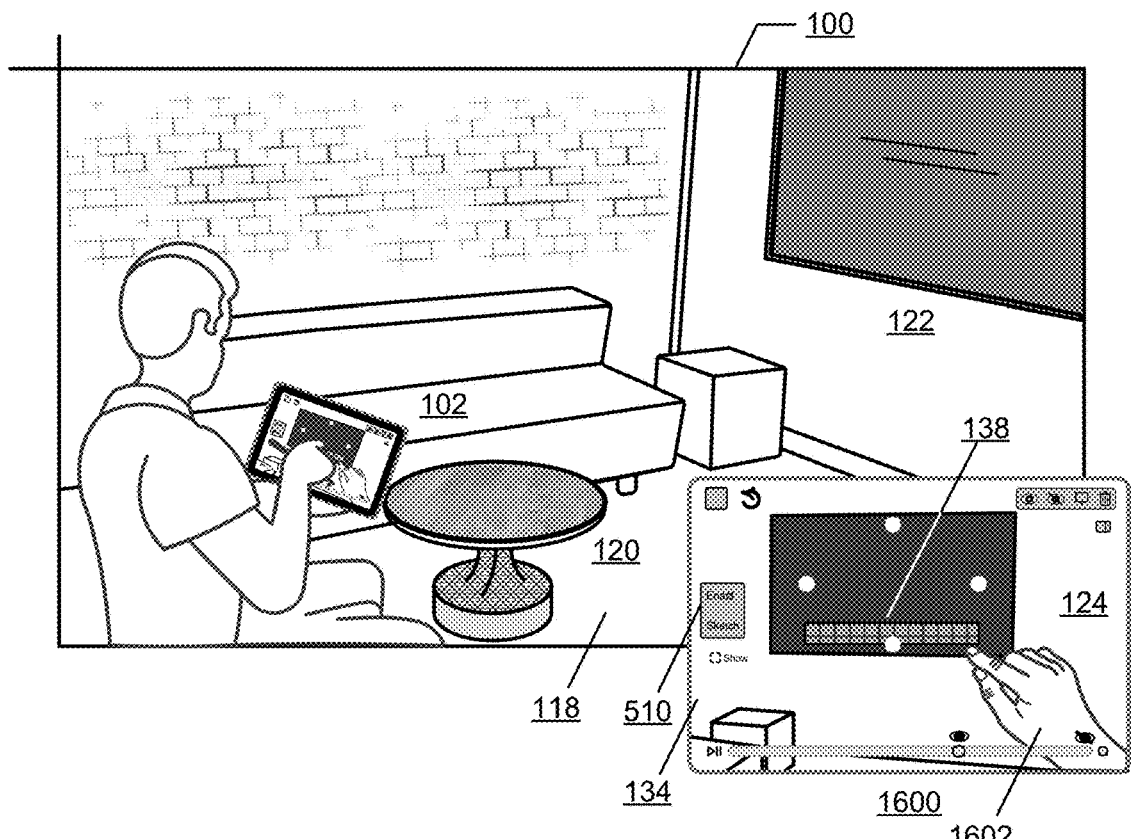
Figure 17:
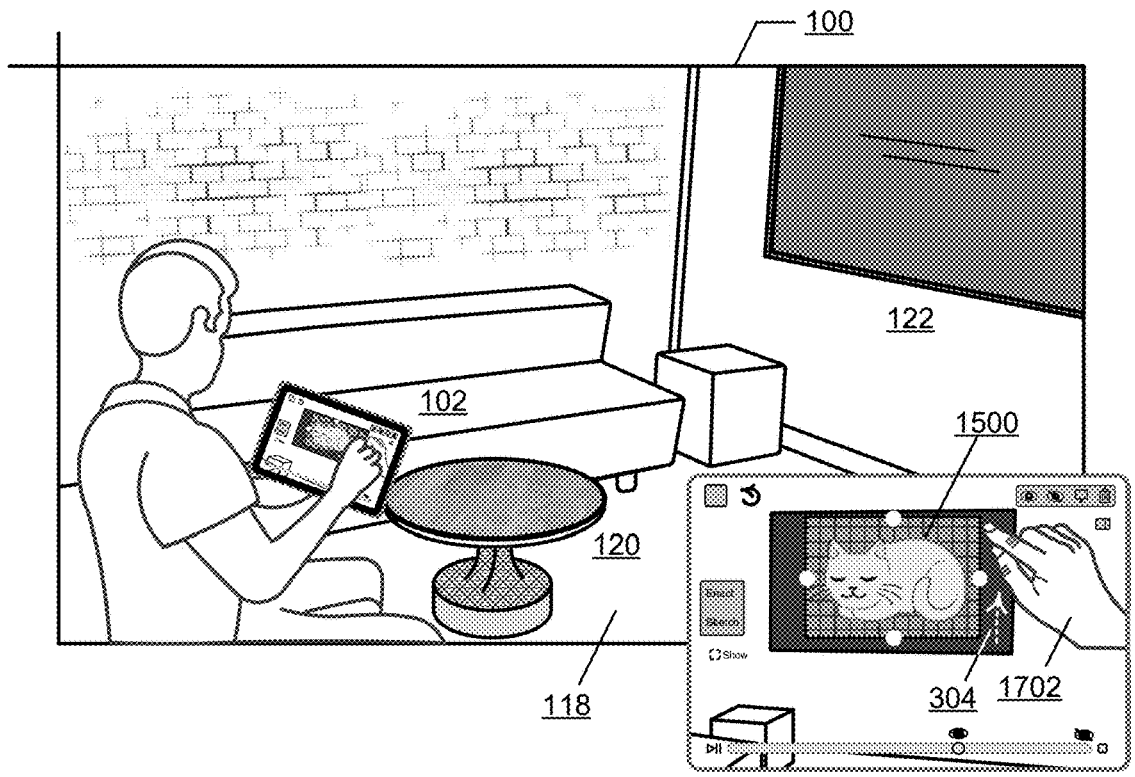

This correlates with FIG. 16 in which the user of the mobile device 102 can initiate the enactment recorder 144 of the video prototyping module 104 via the sketch-enact control 510 on the user interface 134 to create an animation action 146 of the spatial layer 138, as shown in the design view 1600 on the mobile device. Notably, when the user's hand appears in the video frame 124 at the first position 1602, near the bottom of the media display device 122, the spatial layer 138 is collapsed or minimized so as not to display the augmented reality feature 1500 (e.g., the image of the cat). Transitioning to FIG. 17, and as shown in the design view 1700, the user of the mobile device 102 continues the animation action 146 of the spatial layer 138 over subsequent video frames 124. Notably, as the user's hand transitions through the swipe-up gesture 304 across the media display device 122 to the second position 1702, near the top of the media display device 122, the spatial layer 138 is expanded or maximized to again display the augmented reality feature 1500. During playback of the video frames 124 of the captured video 116, the augmented reality feature 1500 will appear over the video and correspond to the swipe-up gesture 304 across the media display device 122, giving the appearance of the user turning on the media display device to show the image of the cat.

Figure 18:
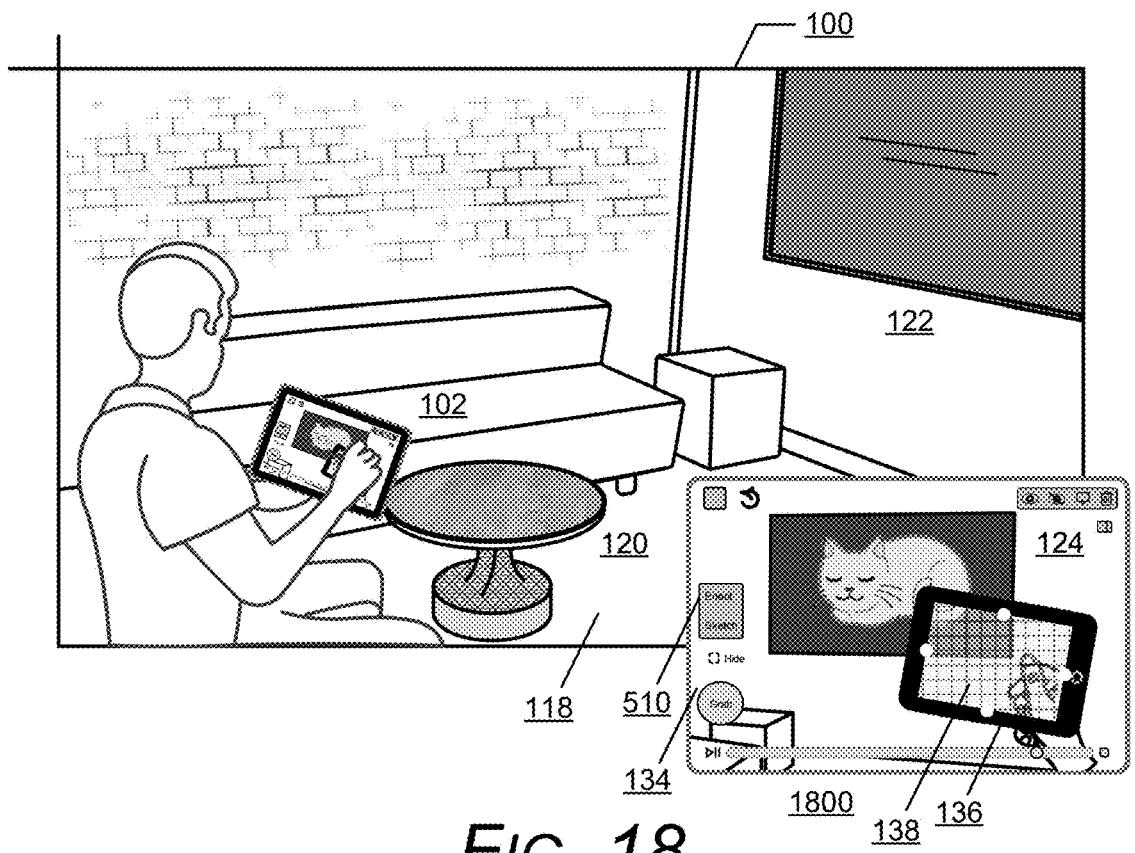
FIGS. 18-21 illustrates another example of creating and adding an augmented reality feature that is displayable with animation during playback of the captured video in aspects of augmented video prototyping.

FIGS. 18-21 illustrate the mobile device 102 being used to add another augmented reality feature that is displayable with animation during playback of the captured video 116. For example, as shown in FIG. 18, the user of the mobile device 102 is using the device within the scene 118 of the environment 100, and holds up the device to add an augmented reality feature that corresponds to the movement gesture 404 towards the media display device 122. In this example, the video frame 124 of the scene generally corresponds to the camera view 402 of the video that is being recorded by the user with the camera device 112 of the scene shown in FIG. 4, with the user adding the movement gesture 404 towards the media display device 122. A design view 1800 of the user interface 134 of the video prototyping module 104 is also shown for perspective in FIG. 18, and shows the user interface over a video frame 124 of the captured video 116, which is what the user who is holding the mobile device 102 sees on the device.

The design view 1800 displays the avatar 136 that is generated by the video prototyping module 104 for display over the video frame 124 of the recorded scene 118 in the environment 100. As shown in this example, the avatar 136 represents the mobile device 102 at the current location of the device in the recorded scene of the captured video 116. The user of the mobile device 102 can then initiate to create a spatial layer 138 over the video frame 124 at the current location of the avatar 136 that represents the mobile device 102 in the scene 118 of the environment. The user interface 134 includes the sketch-enact control 510 that the user can select to create the spatial layer 138 over the video frame 124 of the captured video 116 of the recorded scene 118 in the environment. As described above, the video prototyping module 104 can create the spatial layer 138 over the video frame at the current location of the avatar 136 that represents the mobile device in the scene 118 of the environment 100.

Figure 19:
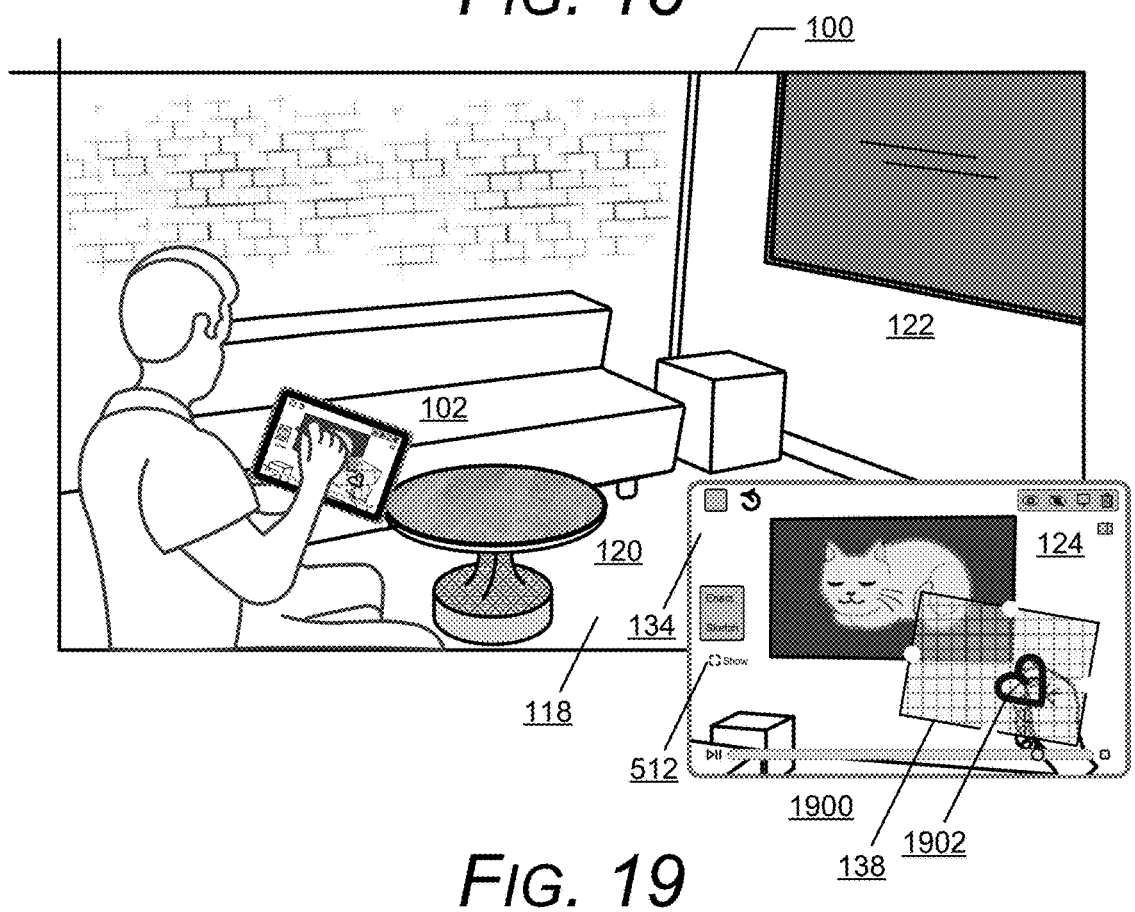

As further shown in FIG. 19, the user can move the mobile device 102 for augmented video prototyping after initiating the spatial layer 138 being created to appear at the position in front of the media display device 122, and over the user's hand as shown in the captured video. The user can also manipulate the size and shape of the spatial layer 138 on the user interface 134 of the video prototyping module 104, as also shown in a design view 1900, which shows what the user who is holding the mobile device 102 sees on the device. Note in the design view 1900 that the user has toggled the hide-show control 512 on the user interface 134 to hide the display of the avatar 136, which was shown in the design view 1800 above in FIG. 18. FIG. 19 illustrates the augmented reality feature 1902 being added as a sketch on the user interface 134 of the video prototyping module 104, as also shown in the design view 1900, which shows what the user who is holding the mobile device 102 sees on the device. For example, the user who is sitting in the environment 100 can initiate the sketch mode of the video prototyping module 104, such as by user selection of the sketch-enact control 510 in the user interface 134. The user of the mobile device 102 can then sketch the augmented reality feature 1902 on the spatial layer 138 shown on the display of the device.

Figure 20:
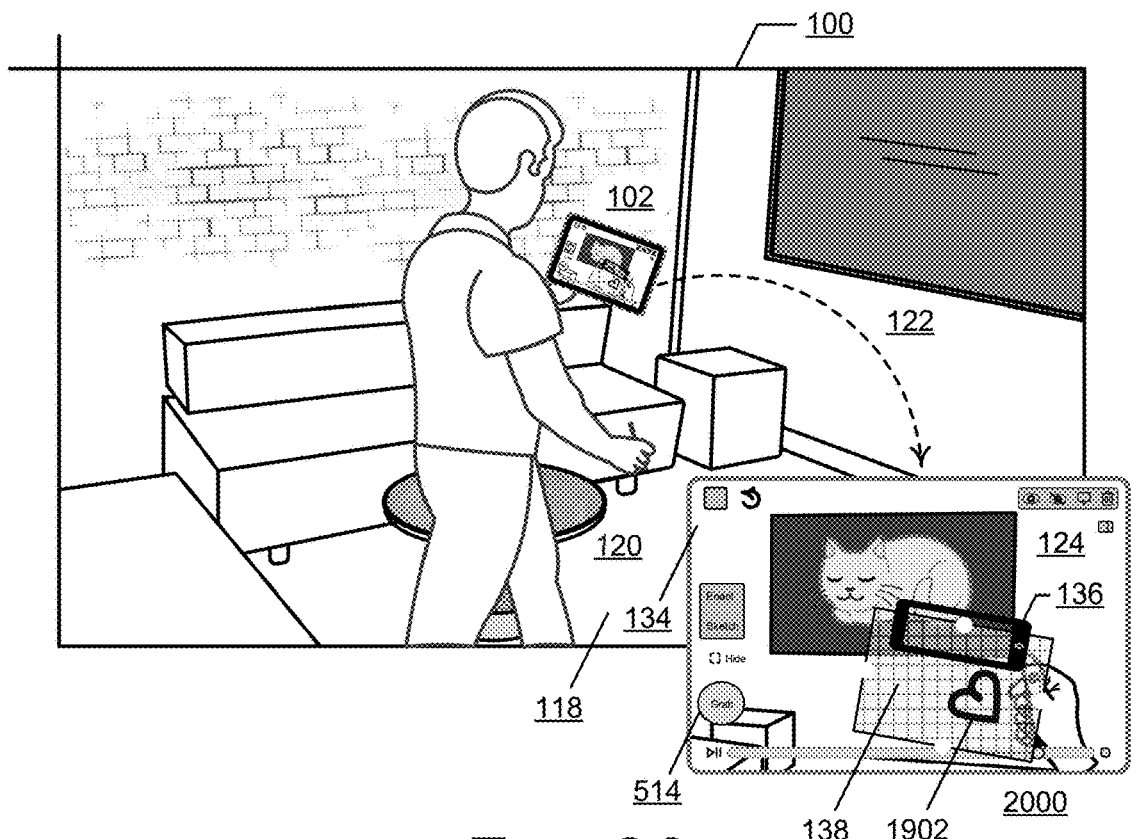
Figure 21:
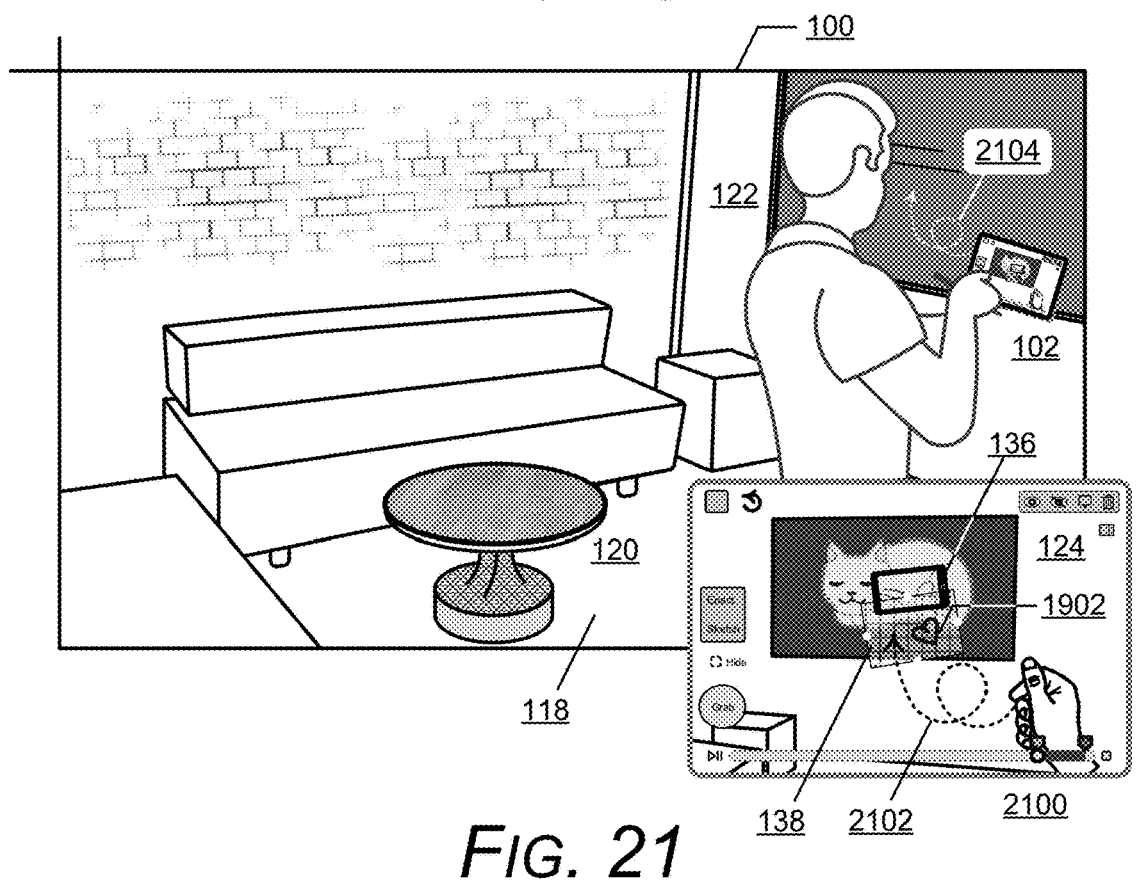

FIGS. 20 and 21 illustrate an animation control feature usable to animate an augmented reality feature in aspects of augmented video prototyping as described herein. In implementations, the avatar 136 that represents the mobile device 102 can be linked or associated with a spatial layer 138, and then as the user moves the mobile device within the environment 100, the spatial layer 138 moves along a motion path according to the movements of the mobile device for a 3D manipulation of an augmented reality feature 140 that is created on and/or associated with the spatial layer. For example, FIG. 20 illustrates the user of the mobile device 102 moving the device within the scene 118 of the environment 100 as the user approaches the media display device 122. As described above, the video prototyping module 104 can localize the mobile device 102 with reference to objects and features shown in the video frame 124 of the recorded scene using the 3D spatial information of the AR tracking data 126 responsive to the mobile device being moved within the boundaries of the scene 118 in the environment. A design view 2000 of the user interface 134 of the video prototyping module 104 is also shown for perspective, and shows the user interface over a video frame 124 of the captured video 116, which is what the user who is holding the mobile device 102 sees on the device.

The design view 2000 also displays the avatar 136 that is generated by the video prototyping module 104 for display over the video frame 124 of the recorded scene 118 in the environment 100. As shown in this example, the avatar 136 represents the mobile device 102 at the current location of the device in the scene of the captured video 116, which in this instance, is approaching the media display device 122. The user of the mobile device 102 can then select the grab-drop control 514 on the user interface 134 to link or associate the avatar 136 with the spatial layer 138. Notably, this technique links the avatar 136 to the augmented reality feature 1902, and the user can then initiate moving the spatial layer 138 (and the augmented reality feature 1902) corresponding to movements of the mobile device 102 in the environment. In this example, the user of the mobile device is prototyping the augmented reality feature 1902 to appear as if the user flings a sketch of a heart towards the image of the cat shown on the media display device 122.

For example, as shown in FIG. 21, and in a design view 2100, the spatial layer 138, along with the augmented reality feature 1902, moves as an animation action 2102 according to movements 2104 of the mobile device 102 as the user moves the device in the environment 100. The video prototyping module 104 can record the movements of the spatial layer 138 as the animation actions 146, and the recorded movements translate to the animation action 2102 that is applied to the augmented reality feature 1902, which can then be displayed as an animation during playback of the captured video 116. The video prototyping module 104 can also map the spatial layer timing and positioning as the mapping 142 of the augmented reality feature 1902 to one or more of the video frames 124 of the captured video 116 during the animation sequence, and the augmented reality feature 1902 (i.e., the sketch of the heart) displays as an animation during playback of the corresponding video frames of the captured video 116.

Figure 22:
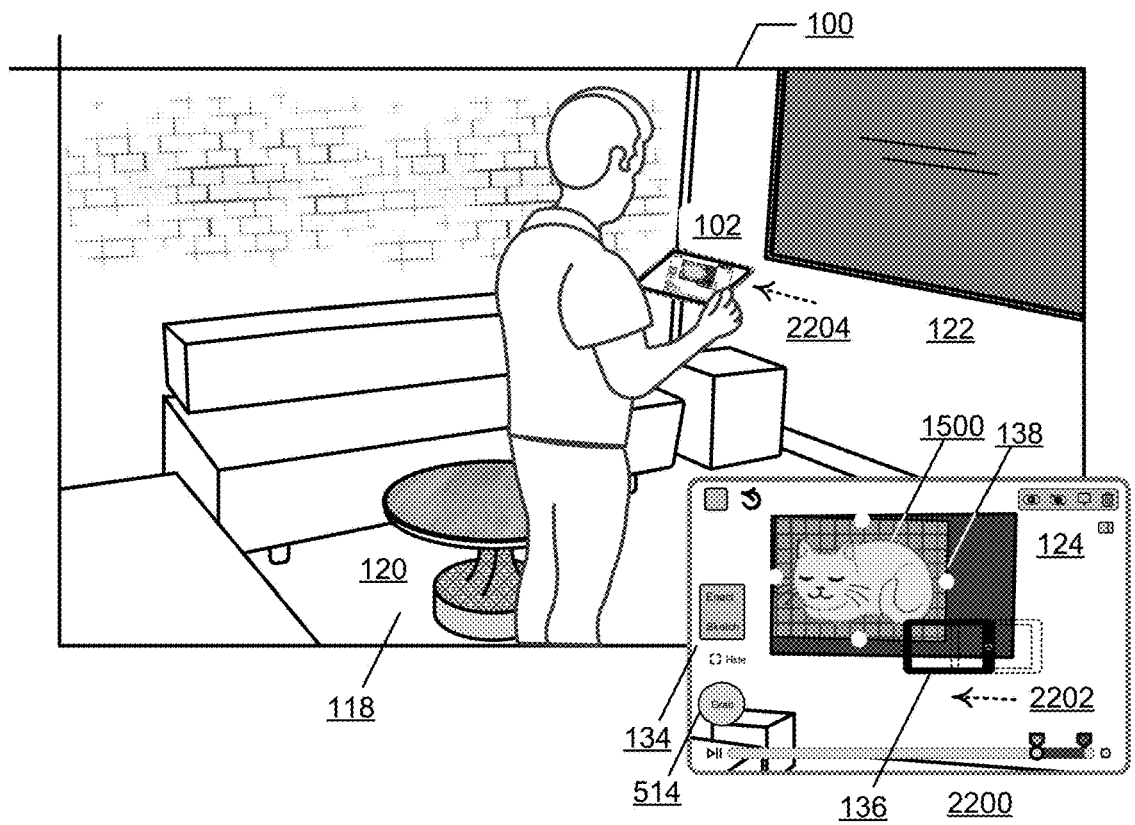
FIGS. 22 and 23 illustrate an animation control feature usable to animate an augmented reality feature that is displayable with animation during playback of the captured video in aspects of augmented video prototyping.
Figure 23:
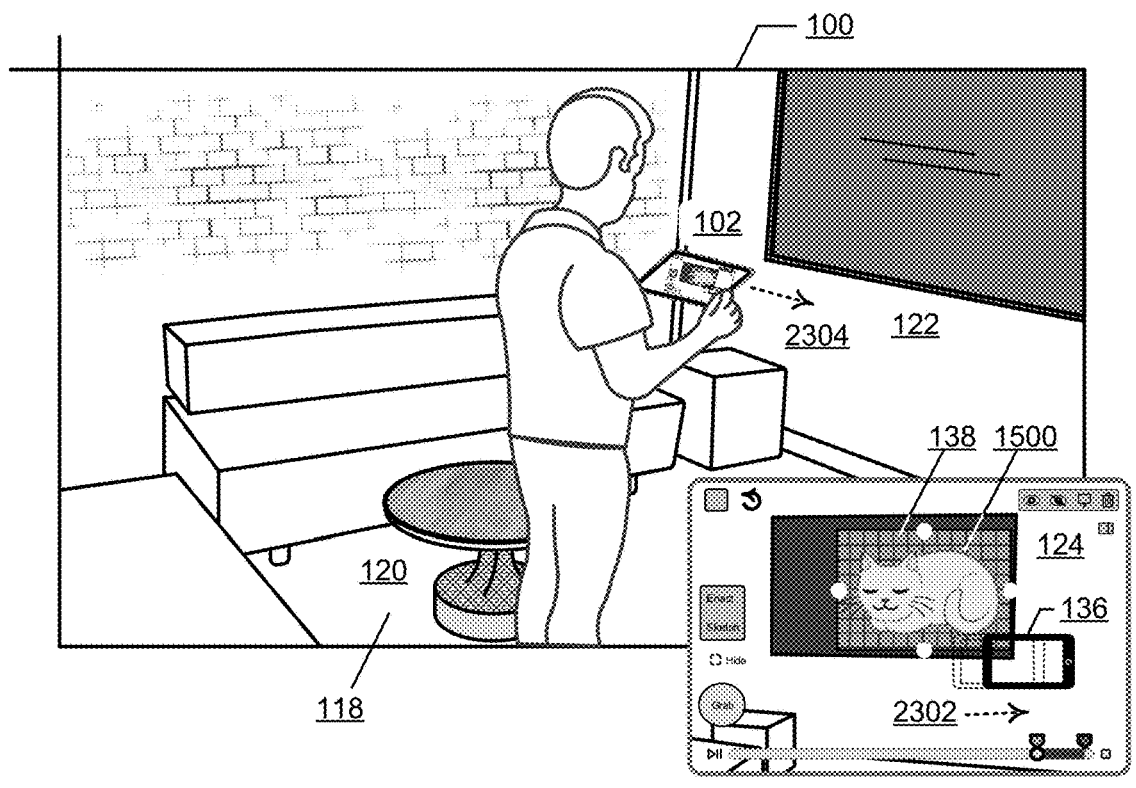

FIGS. 22 and 23 further illustrate the animation control feature usable to animate an augmented reality feature in aspects of augmented video prototyping, as described above with reference to FIGS. 21 and 22. Notably, an avatar 136 that represents the mobile device 102 can be linked or associated with a spatial layer 138, and then as the user moves the mobile device within the scene 118 of the environment, the spatial layer 138 moves along with the movement of the mobile device for a 3D manipulation of an augmented reality feature 140 that is created on and/or associated with the spatial layer. For example, FIG. 22 illustrates the user of the mobile device 102 standing within the scene 118 of the environment near the media display device 122. As described above, the video prototyping module 104 can localize the mobile device 102 with reference to objects and features shown in the video frame 124 of the recorded scene using the 3D spatial information of the AR tracking data 126 responsive to the mobile device being moved within the boundaries of the scene 118 in the environment. A design view 2200 of the user interface 134 of the video prototyping module 104 is also shown for perspective, and shows the user interface over a video frame 124 of the captured video 116, which is what the user who is holding the mobile device 102 sees on the device.

The design view 2200 also displays the avatar 136 that is generated by the video prototyping module 104 for display over the video frame 124 of the recorded scene 118 in the environment 100. As shown in this example, the avatar 136 represents the mobile device 102 at the current location of the device in the recorded scene of the captured video 116, which in this instance, is proximate the media display device 122. The user of the mobile device 102 can then select the grab-drop control 514 on the user interface 134 to link or associate the avatar 136 with the spatial layer 138. Notably, this technique links the avatar 136 to the augmented reality feature 1500 (i.e., the image of the cat), and the user can then initiate moving the spatial layer 138 along with the avatar 136 in a direction 2202 corresponding to a movement 2204 of the mobile device 102 in the environment. In this example, the user of the mobile device is prototyping the augmented reality feature 1500 to appear as if the cat shakes back and forth after the user flings the heart towards the cat, as shown and described above with reference to FIGS. 18-21.

FIG. 23 further shows, in a design view 2300, that the spatial layer 138, along with the augmented reality feature 1500, moves as an animation action 2302 corresponding to a movement 2304 of the mobile device 102 as the user moves the device in the environment 100. The video prototyping module 104 can record the movements of the spatial layer 138 as the animation actions 146, and the recorded movements translate to the back and forth animation actions that are applied to the augmented reality feature 1500, which can then be displayed as an animation during playback of the captured video 116. The video prototyping module 104 can also map the spatial layer timing and positioning as the mapping 142 of the augmented reality feature 1500 to one or more of the video frames 124 of the captured video 116 during the animation sequence, and the augmented reality feature 1500 (i.e., the image of the cat) displays as an animation during playback of the corresponding video frames of the captured video 116.

Figure 24:
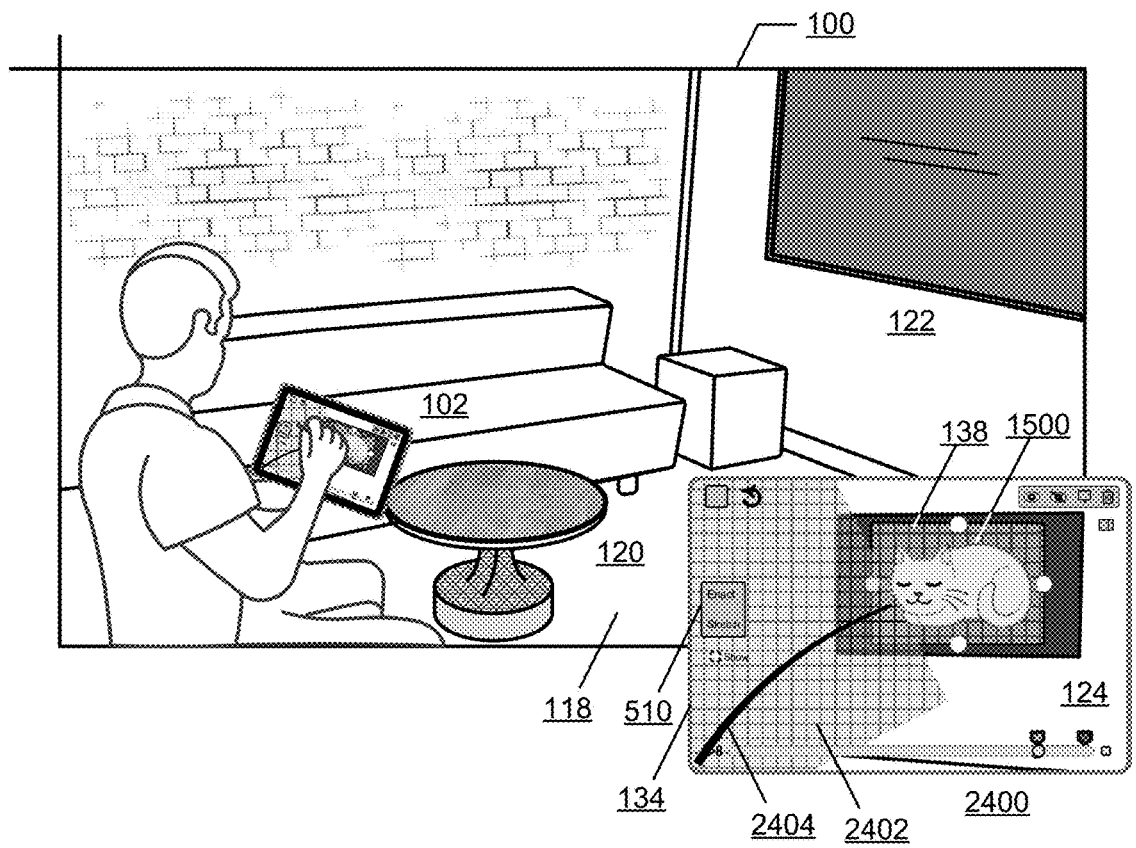
FIG. 24 illustrates another an animation control feature usable to animate an augmented reality feature that is displayable with animation during playback of the captured video in aspects of augmented video prototyping.

FIG. 24 illustrates another animation control feature of augmented video prototyping as described herein. In implementations, an augmented reality feature 140 of a spatial layer 138 can be assigned to an animation feature of another spatial layer that is used to guide animation of the augmented reality feature. For example, a design view 2400 of the user interface 134 of the video prototyping module 104 is shown for perspective, and shows the spatial layer 138 and the associated augmented reality feature 1500 (i.e., the image of the cat), which is what the user who is holding the mobile device 102 sees on the device. The user interface 134 includes the sketch-enact control 510 that the user can select to create an additional spatial layer 2402 over the video frame 124 of the captured video 116 of the recorded scene 118 in the environment.

The video prototyping module 104 can receive an input of a motion path sketch 2404 on the additional spatial layer 2402, as drawn by the user of the mobile device 102. The augmented reality feature 1500 of the spatial layer 138 can then be assigned to the motion path sketch 2404 on the additional spatial layer, and the augmented reality feature 1500 then displays as an animation that moves according to the motion path sketch 2404 during playback of the corresponding video frames of the captured video 116. The enactment of the additional spatial layer 2402 is assigned to the selected spatial layer 138 to animate the augmented reality feature 1500. In this example, the image of the cat will appear to come out of the media display device 122, moving left and downward off of the display screen of the mobile device. Notably, this assignment feature of augmented video prototyping can be used to animate multiple augmented reality features at the same time, such as to animate raindrops. For example, hundreds of spatial layers 138 that each include a raindrop as an augmented reality feature 140 can be assigned to the same additional spatial layer with a line-sketch that animates the dropping motion of all of the raindrops together.

Figure 25:
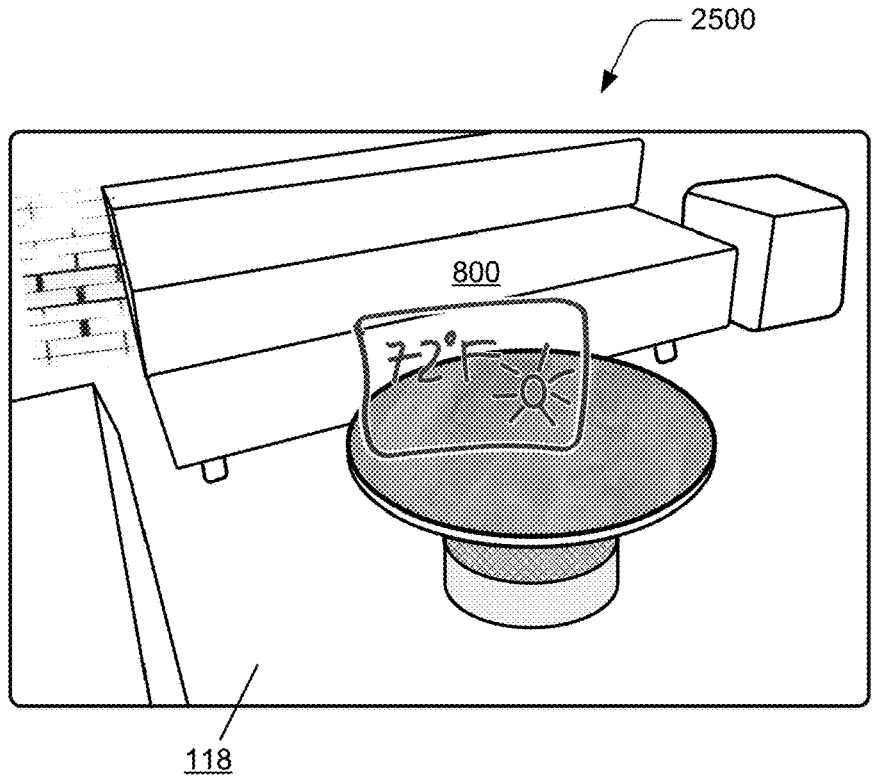
FIGS. 25-29 illustrate the playback of the captured video overlaid with the augmented video prototyping features created as shown and described above with reference to FIGS. 6-24 in aspects of augmented video prototyping.

FIGS. 25-29 illustrate the playback of the captured video 116 overlaid with the augmented video prototyping features created as shown and described above with reference to FIGS. 6-24. For example, as the captured video 116 is played back for viewing, FIG. 25 illustrates an example 2500 of the augmented reality feature 800 being shown as a simple display screen that displays the current temperature and an indication of the weather on the table in the scene 118 as captured in the video. During playback of the captured video 116, the augmented reality feature 800 will appear over the video during the closer views of the table, as previously recorded by the user with the camera device 112 of the mobile device 102. This prototype of the augmented reality feature 800 generally corresponds to the camera view 200 of the video that is being recorded by the user as shown in FIG. 2, with a closer view of the table, and corresponds to prototyping of the augmented reality feature 800 as shown and described with reference to FIGS. 6-11.

Figure 26:
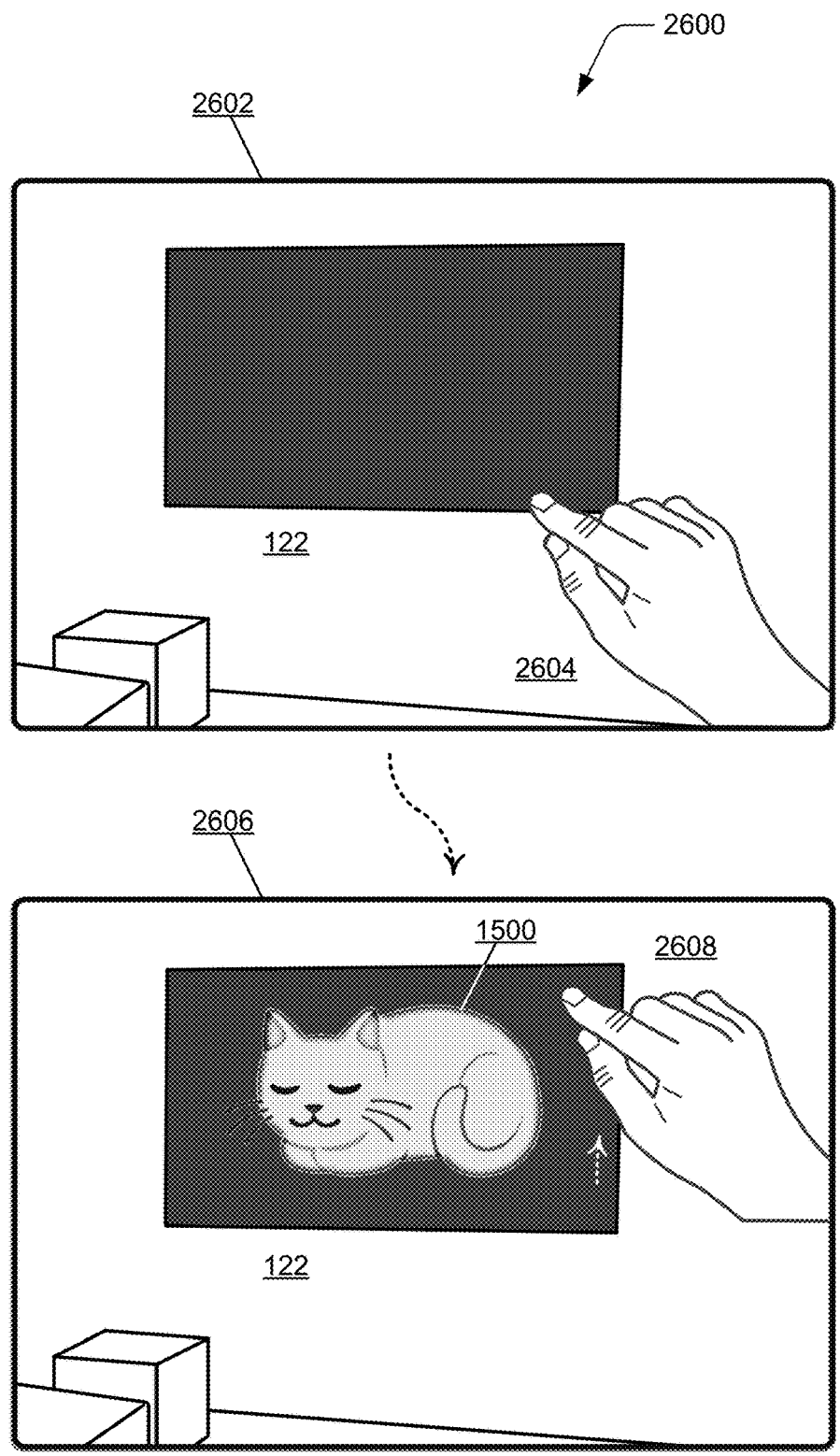

FIG. 26 further illustrates an example 2600 of the animation of the augmented reality feature 1500 (i.e., the image of the cat) shown as the user swipe-up gesture 304 across the media display device 122, giving the appearance of the user turning on the media display device 122 to display the image of the cat. As shown in the video playback of the captured video at 2602, the user's hand appears in the video at a first position 2604 near the bottom of the media display device 122, and transitioning to the video playback at 2606, the user swipes-up across the media display device 122 to a second position 2608 of the user's hand near the top of the display, giving the appearance of turning on the device to display the image of the cat. This prototype of the augmented reality feature 1500 generally corresponds to the camera view 300 of the video that is being recorded by the user as shown in FIG. 3, and corresponds to the prototyping of the augmented reality feature 1500 as shown and described with reference to FIGS. 12-17.

Figure 27:
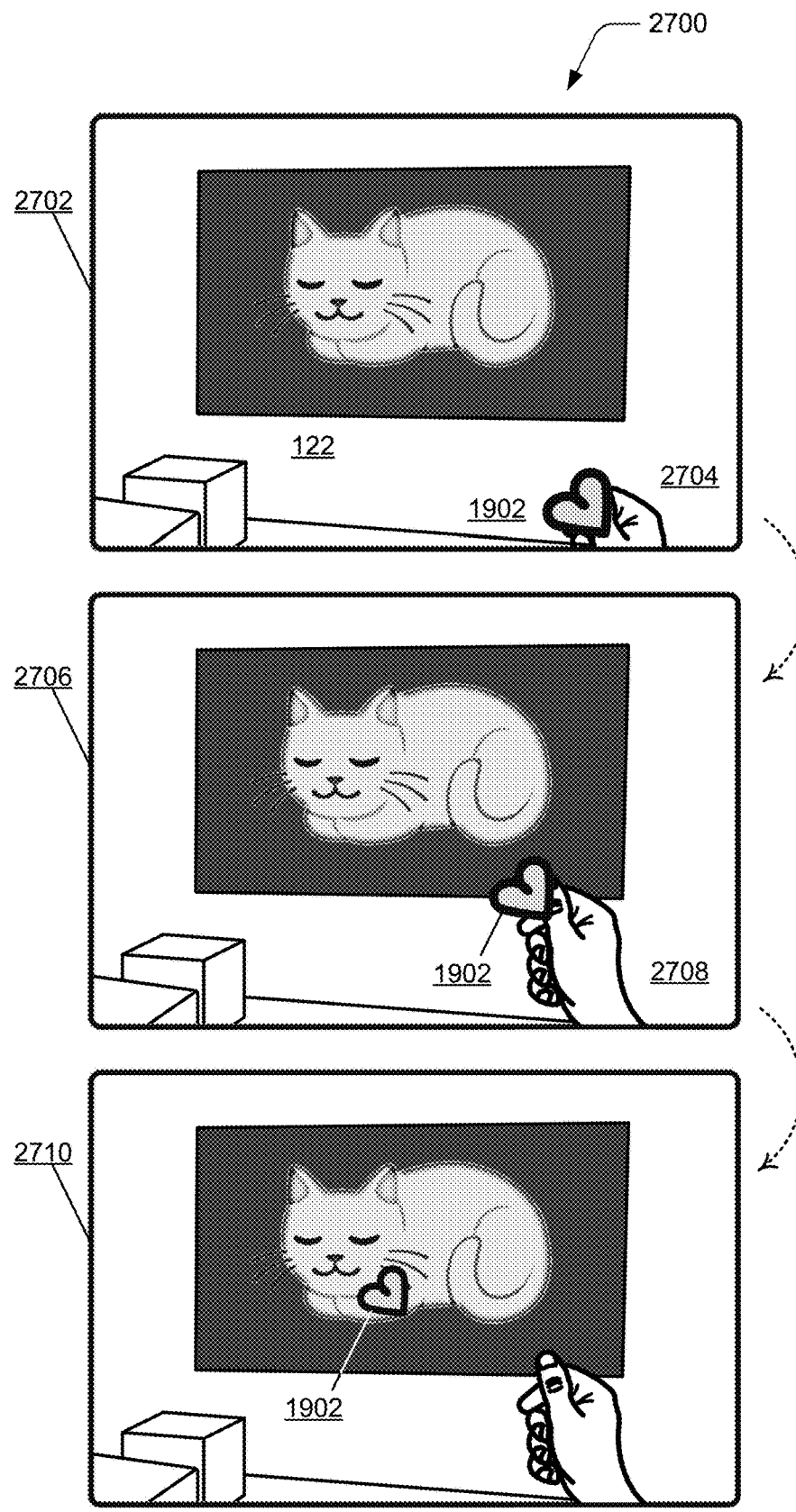

FIG. 27 further illustrates an example 2700 of the animation of the augmented reality feature 1902 (i.e., the sketch of the heart) shown as the movement gesture 404 towards the media display device 122, giving the appearance of the user flinging a heart towards the cat shown on the display. As shown in the video playback of the captured video at 2702, the user's hand appears in the video at a first position 2704, and transitioning to the video playback at 2706, the user's hand moves towards the media display device 122 as the movement gesture to a second position 2708 of the user's hand. The animation of the augmented reality feature 1902 follows the user's hand as it appears in the video at the first position 2704 and moves towards the media display device 122 as the movement gesture to the second position 2708 of the user's hand. Transitioning to the video playback 2710, the animation of the augmented reality feature 1902 continues, leaving the user's hand and flinging the heart to the cat on the media display device. This prototype of the augmented reality feature 1902 generally corresponds to the camera view 400 of the video that is being recorded by the user as shown in FIG. 4, and corresponds to the prototyping of the augmented reality feature 1902 as shown and described with reference to FIGS. 18-21.

Figure 28:
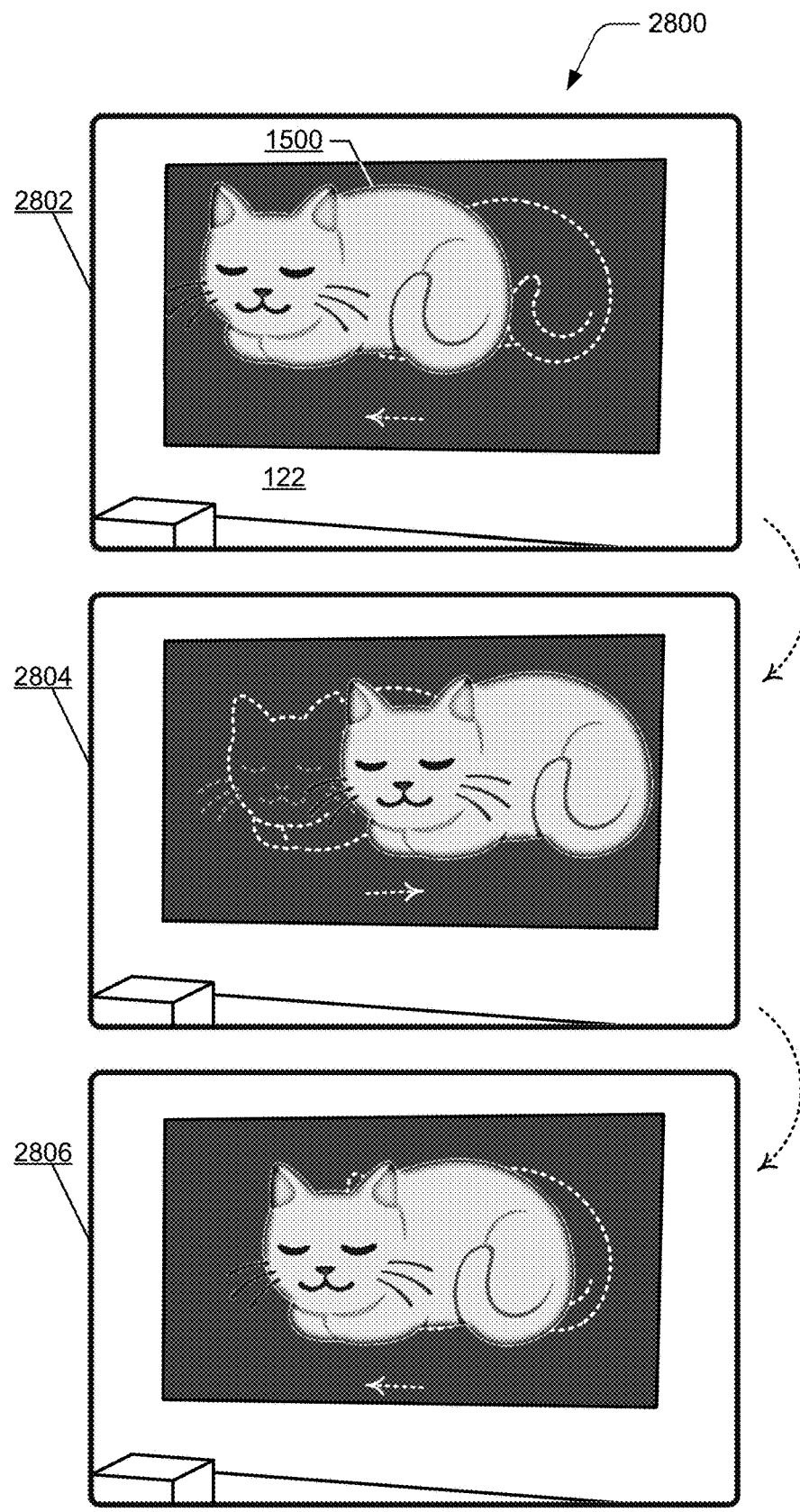

FIG. 28 further illustrates an example 2800 of the animation of the augmented reality feature 1500 (i.e., the image of the cat), giving the appearance of the cat shaking back and forth after the user flings the heart towards the cat. As shown in the video playback 2802 of the captured video, the augmented reality feature 1500 moves left over the media display device 122, transitions to the video playback 2804 and moves right over the media display device, and further transitions to the video playback 2806 and moves back left over the media display device in the captured video. This prototype of the augmented reality feature 1500 generally corresponds to the prototyping of the augmented reality feature as shown and described with reference to FIGS. 22 and 23.

Figure 29:
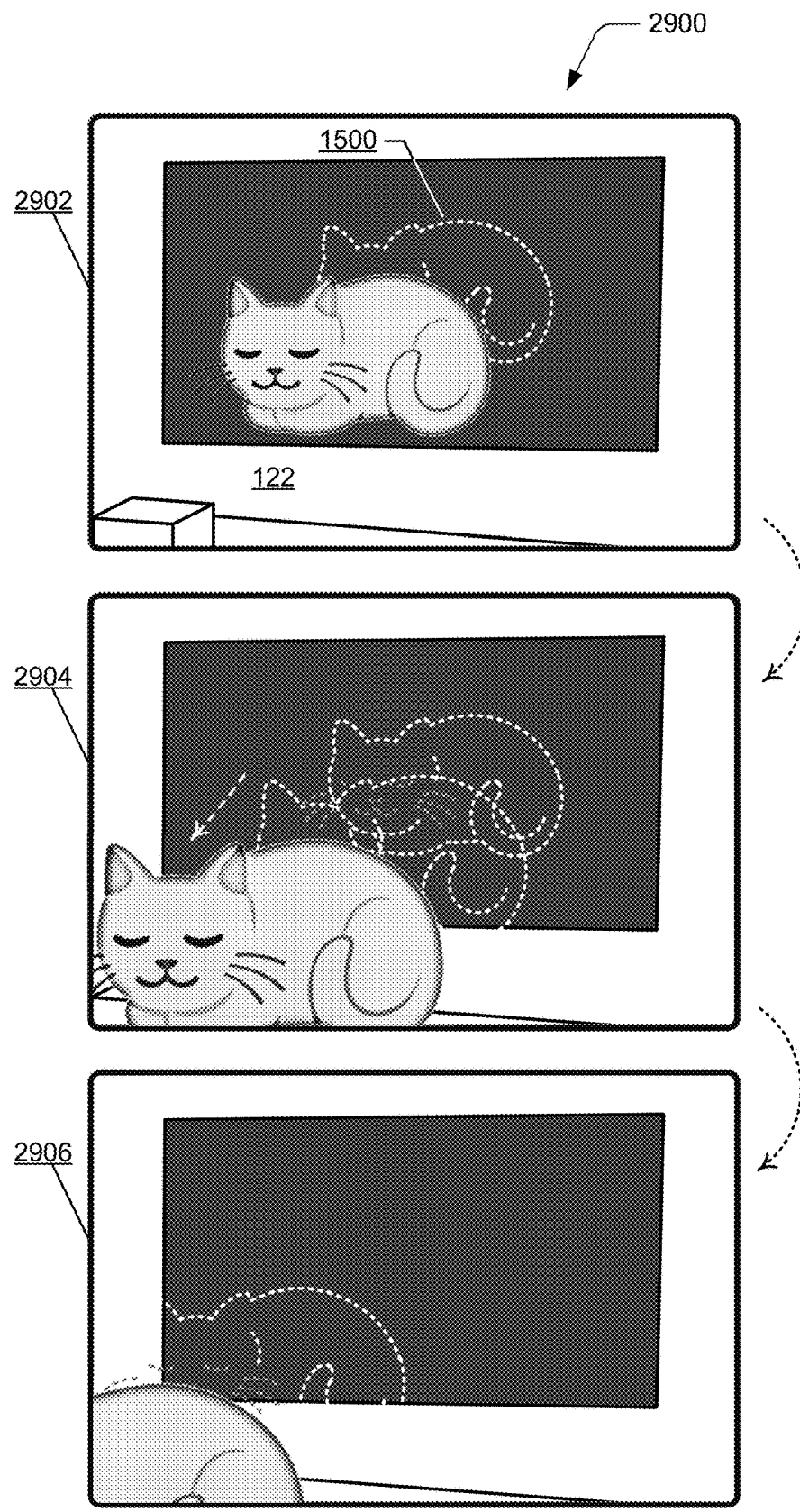

FIG. 29 further illustrates an example 2900 of another animation of the augmented reality feature 1500 (i.e., the image of the cat), giving the appearance of the cat coming out of the media display device 122, moving left and downward off of the display screen of the mobile device 102. As shown in the video playback 2902 of the captured video, the augmented reality feature 1500 begins to move across the media display device 122, transitions to the video playback 2904 and continues to move out of the media display device, and further transitions to the video playback 2906 and continues to move off of the display screen of the mobile device. This prototype of the augmented reality feature 1500 generally corresponds to the prototyping of the augmented reality feature as shown and described with reference to FIG. 24.

Example methods 3000, 3100, 3200, and 3300 are described with reference to respective FIGS. 30, 31, 32, and 33 in accordance with one or more aspects of augmented video prototyping. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 30:
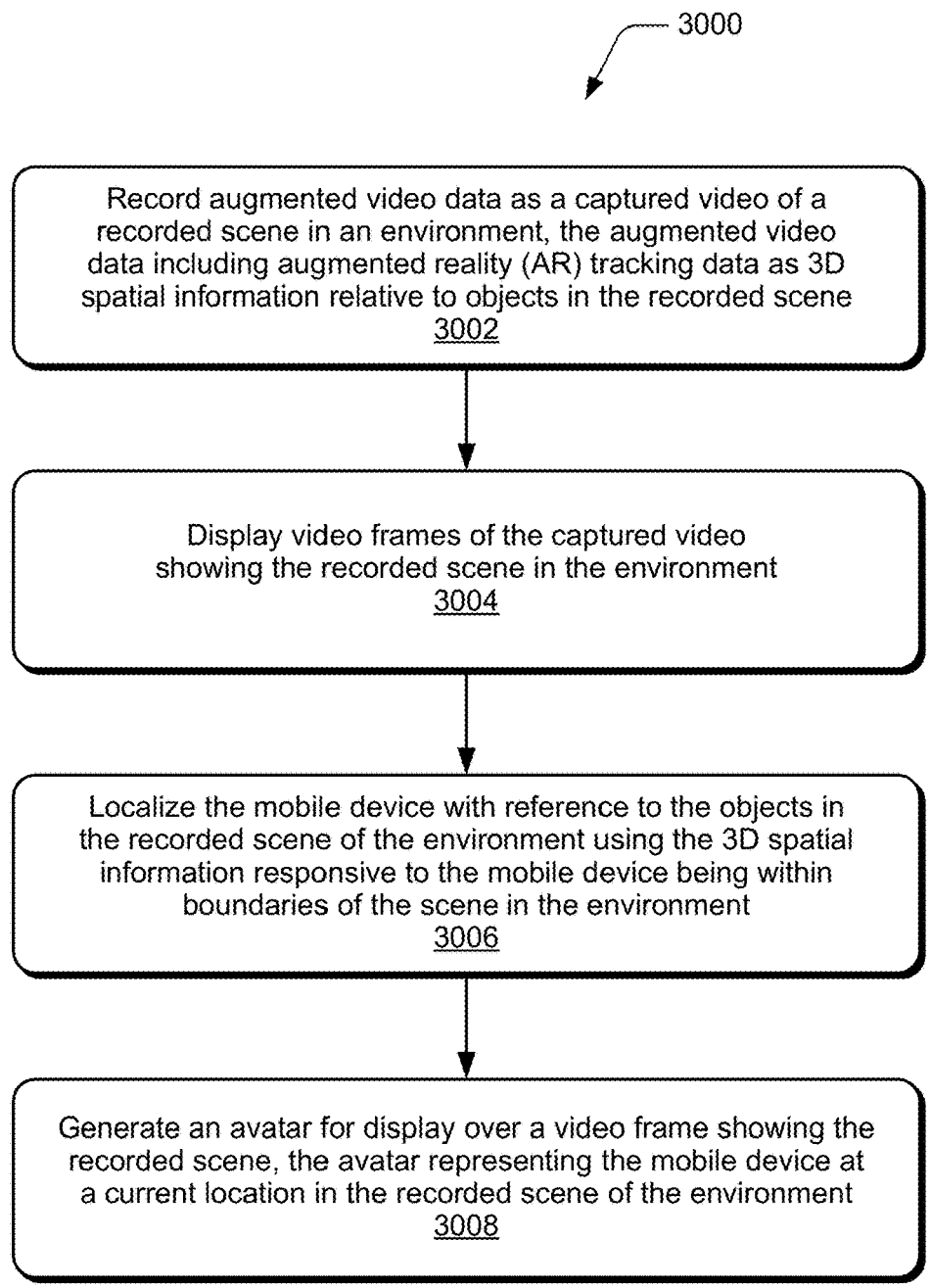
FIGS. 30-33 illustrate example methods of augmented video prototyping in accordance with one or more implementations.

FIG. 30 illustrates example method(s) 3000 for augmented video prototyping, and is generally described with reference to the video prototyping module implemented by a computing device as shown and described with reference to FIGS. 1-29. The order in which the method is described is not intended to be construed as a limitation, and any number or combination of the method operations can be combined in any order to implement a method, or an alternate method.

At 3002, augmented video data is recorded as a captured video of a recorded scene in an environment, the augmented video data including augmented reality (AR) tracking data as 3D spatial information relative to objects in the recorded scene. For example, the mobile device 102 includes the camera device 112 that can be used to record the augmented video data 114 as the captured video 116 of the recorded scene 118 in the example environment 100. The augmented video data 114 includes the augmented reality (AR) tracking data 126 as 3D spatial information relative to the objects 120 in the captured video 116 of the recorded scene 118, as well as relative to the position of the camera device 112 (i.e., in the mobile device 102) while the augmented video data 114 is being recorded.

At 3004, video frames of the captured video showing the recorded scene in the environment are displayed. For example, the mobile device 102 includes the display device 110 to display the video frames 124 of the captured video 116 showing the recorded scene 118 in the environment 100.

At 3006, the mobile device is localized with reference to the objects in the recorded scene of the environment using the 3D spatial information responsive to the mobile device being within boundaries of the scene in the environment. For example, the mobile device 102 may move to within the boundaries of the scene 118 in the environment 100, and the video prototyping module 104 implemented by the mobile device can use the 3D spatial information of the AR tracking data 126 to localize the mobile device 102 with reference to the objects 120 in a video frame 124 of the recorded scene, as well as determine current and subsequent device locations 132 within the boundaries of the scene 118 of the environment.

At 3008, an avatar is generated for display over a video frame showing the recorded scene, the avatar representing the mobile device at a current location from the perspective of the recorded scene of the environment. For example, the video prototyping module 104 implemented by the mobile device 102 can generate the avatar 136 as a representation of the mobile device 102, which can be displayed in the recorded scene of the captured video. The avatar 136 is a visualization of the current position of the mobile device 102 in the environment 100 as the user moves the mobile device around in the environment after the captured video 116 is recorded.

Figure 31:
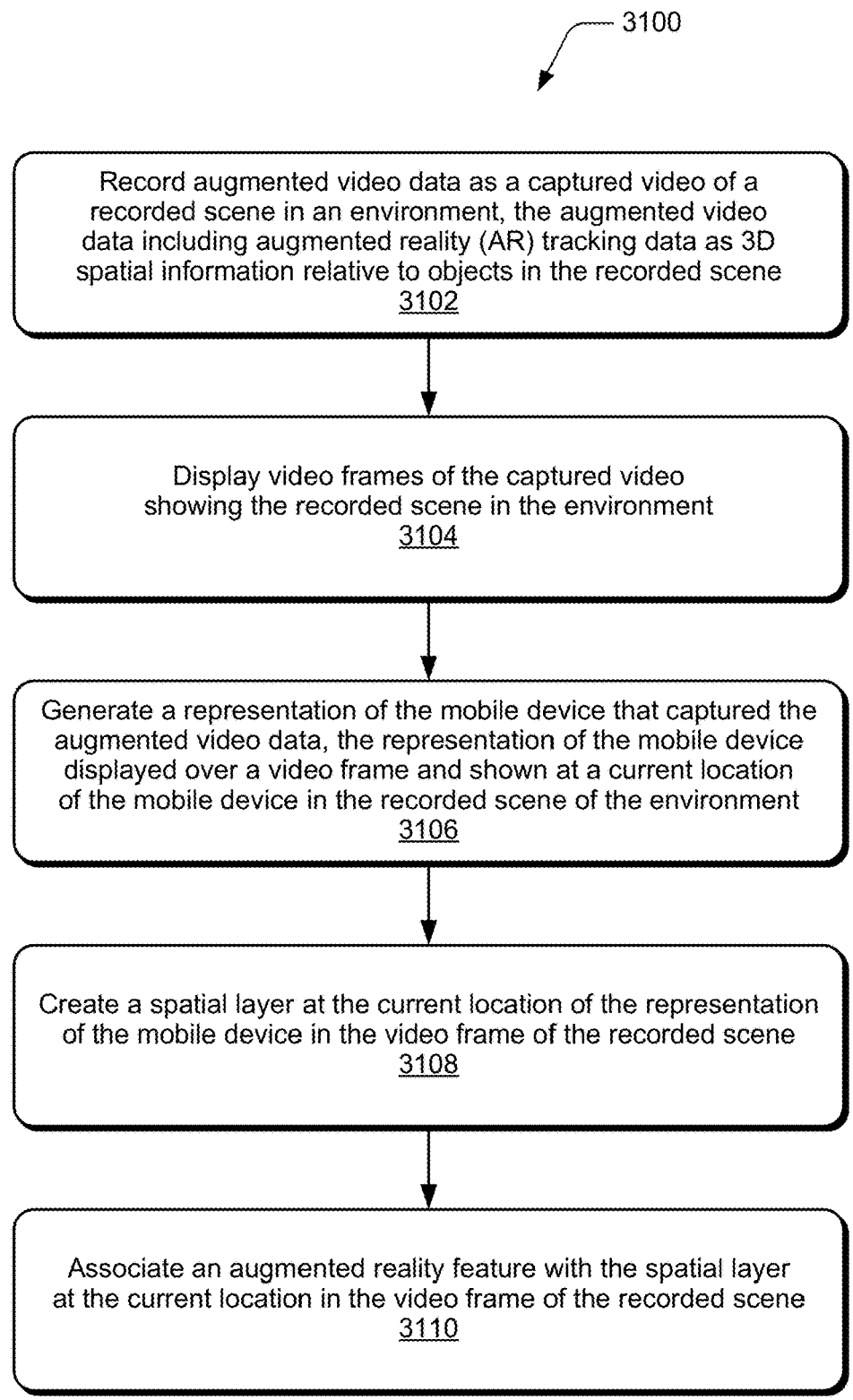

FIG. 31 illustrates example method(s) 3100 for augmented video prototyping, and is generally described with reference to the video prototyping module implemented by a computing device as shown and described with reference to FIGS. 1-29. The order in which the method is described is not intended to be construed as a limitation, and any number or combination of the method operations can be combined in any order to implement a method, or an alternate method.

At 3102, augmented video data is recorded as a captured video of a recorded scene in an environment, the augmented video data including augmented reality (AR) tracking data as 3D spatial information relative to objects in the recorded scene. For example, the mobile device 102 includes the camera device 112 that can be used to record the augmented video data 114 as the captured video 116 of the recorded scene 118 in the example environment 100. The augmented video data 114 includes the augmented reality (AR) tracking data 126 as 3D spatial information relative to the objects 120 in the captured video 116 of the recorded scene 118, as well as relative to the position of the camera device 112 (i.e., in the mobile device 102) while the augmented video data 114 is being recorded.

At 3104, video frames of the captured video showing the recorded scene in the environment are displayed. For example, the mobile device 102 includes the display device 110 to display the video frames 124 of the captured video 116 showing the recorded scene 118 in the environment 100.

At 3106, a representation of the mobile device that captured the augmented video data is generate for display over a video frame, and is shown at a current location of the mobile device in the recorded scene of the environment. For example, the video prototyping module 104 implemented by the mobile device 102 can generate the representation of the mobile device 102 as an avatar 136 that is displayed in the video frames 124 of the recorded scene 118 at the current location of the mobile device. The avatar 136 is a visualization of the current position of the mobile device 102 in the environment 100 as the user moves the mobile device around in the environment after the captured video 116 is recorded.

At 3108, a spatial layer is created at the current location of the representation of the mobile device in the video frame of the recorded scene. For example, the video prototyping module 104 implemented by the mobile device 102 can create the spatial layer 138 at the current location of the avatar 136 that represents the mobile device 102 in a video frame 124 of the recorded scene 118, and the spatial layer is localized with reference to the objects in the video frame of the recorded scene using the 3D spatial information. The spatial layer 138 is an interactive interface on which to create an augmented reality feature 140 that displays during playback of the captured video 116.

At 3110, an augmented reality feature is associated with the spatial layer at the current location in the video frame of the recorded scene. For example, the video prototyping module 104 implemented by the mobile device 102 can associate an augmented reality feature 140, such as any type of a sketch, image, animation, 3D model, etc. with the spatial layer 138 that is created at the current location of the avatar 136 that represents the mobile device 102 in a video frame 124 of the recorded scene 118.

Figure 32:
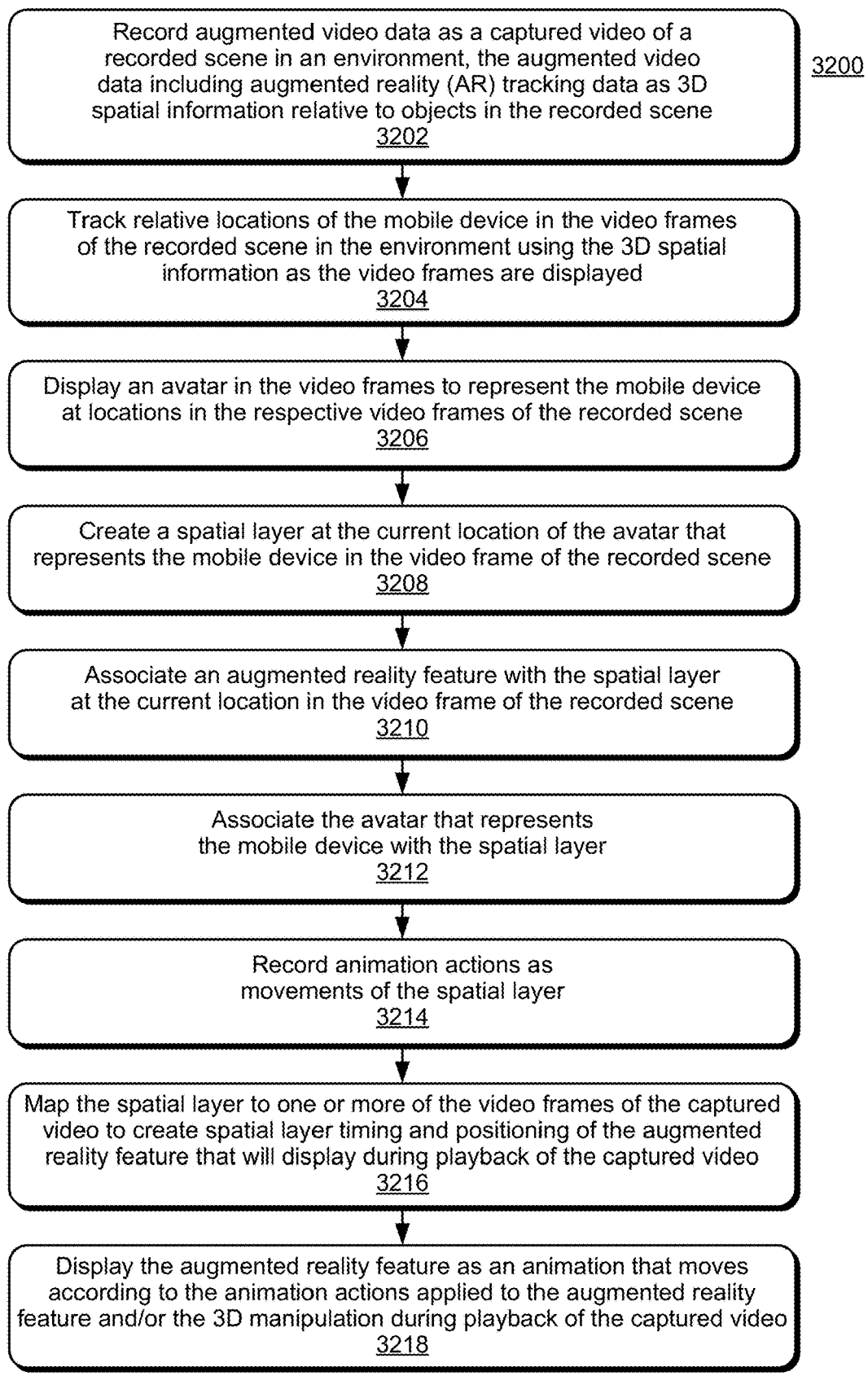

FIG. 32 illustrates example method(s) 3200 for augmented video prototyping, and is generally described with reference to the video prototyping module implemented by a computing device as shown and described with reference to FIGS. 1-29. The order in which the method is described is not intended to be construed as a limitation, and any number or combination of the method operations can be combined in any order to implement a method, or an alternate method.

At 3202, augmented video data is recorded as a captured video of a recorded scene in an environment, the augmented video data including augmented reality (AR) tracking data as 3D spatial information relative to objects in the recorded scene. For example, the mobile device 102 includes the camera device 112 that can be used to record the augmented video data 114 as the captured video 116 of the recorded scene 118 in the example environment 100. The augmented video data 114 includes the augmented reality (AR) tracking data 126 as 3D spatial information relative to the objects 120 in the captured video 116 of the recorded scene 118, as well as relative to the position of the camera device 112 (i.e., in the mobile device 102) while the augmented video data 114 is being recorded.

At 3204, relative locations of the mobile device are tracked in the video frames of the recorded scene in the environment using the 3D spatial information as the video frames are displayed. For example, the video prototyping module 104 implemented by the mobile device 102 can track relative locations of the mobile device in the video frames 124 of the recorded scene 118 in the environment 100 using the 3D spatial information as the video frames are displayed.

At 3206, an avatar is displayed in the video frames to represent the mobile device at locations in the respective video frames of the recorded scene. For example, the video prototyping module 104 implemented by the mobile device 102 generates the avatar 136 that is displayed in the video frames 124 of the recorded scene 118 as a representation of the mobile device 102. The avatar 136 is a visualization of the current position of the mobile device 102 in the environment 100 as the user moves the mobile device around in the environment after the captured video 116 is recorded.

At 3208, a spatial layer is created at the current location of the avatar that represents the mobile device in the video frame of the recorded scene, the spatial layer being localized with reference to the objects in the video frame of the recorded scene using the 3D spatial information. For example, the video prototyping module 104 implemented by the mobile device 102 can create the spatial layer 138 at the current location of the avatar 136 that represents the mobile device 102 in a video frame 124 of the recorded scene 118. The spatial layer 138 is an interactive interface on which to create an augmented reality feature 140 that displays during playback of the captured video 116, and a spatial layer 138 can be localized with reference to the objects 120 in the video frame 124 of the recorded scene 118 using the 3D spatial information in the AR tracking data 126.

At 3210, an augmented reality feature is associated with the spatial layer at the current location in the video frame of the recorded scene. For example, the video prototyping module 104 implemented by the mobile device 102 can associate an augmented reality feature 140, such as any type of a sketch, image, animation, 3D model, etc. with the spatial layer 138 that is created at the current location of the avatar 136 that represents the mobile device 102 in a video frame 124 of the recorded scene 118.

At 3212, the avatar that represents the mobile device is associated with the spatial layer. For example, the video prototyping module 104 implemented by the mobile device 102 can link or associate the avatar 136 with the spatial layer 138, which links the avatar 136 to the augmented reality feature 140 of the spatial layer, and the user can then initiate moving the spatial layer 138 (and the augmented reality feature) corresponding to movements of the mobile device 102 in the environment.

At 3214, animation actions are recorded as movements of the spatial layer. For example, the video prototyping module 104 implemented by the mobile device 102 can initiate to record movements of the spatial layer 138 as the animation actions 146 according to movements of the mobile device 102 as the user moves the device in the environment 100. The recorded movements translate to animation actions 146 that can be applied to an augmented reality feature 140 that is associated with the spatial layer, and the animation actions can then be displayed as an animation during playback of the captured video 116.

At 3216, the spatial layer is mapped to one or more of the video frames of the captured video to create spatial layer timing and positioning of the augmented reality feature that will display during playback of the captured video. At 3218, the augmented reality feature is displayed as an animation that moves according to the animation actions applied to the augmented reality feature and/or the 3D manipulation during playback of the captured video. For example, the video prototyping module 104 implemented by the mobile device 102 can map the spatial layer timing and positioning as the mapping 142 of the augmented reality feature 140 to one or more of the video frames 124 of the captured video 116 during the animation sequence, and the augmented reality feature 140 displays as an animation during playback of the corresponding video frames 124 of the captured video 116. Notably, the augmented reality feature 140 is displayed as an animation that moves according to the animation actions 146 applied to the augmented reality feature and/or the 3D manipulations during playback of the captured video.

Figure 33:
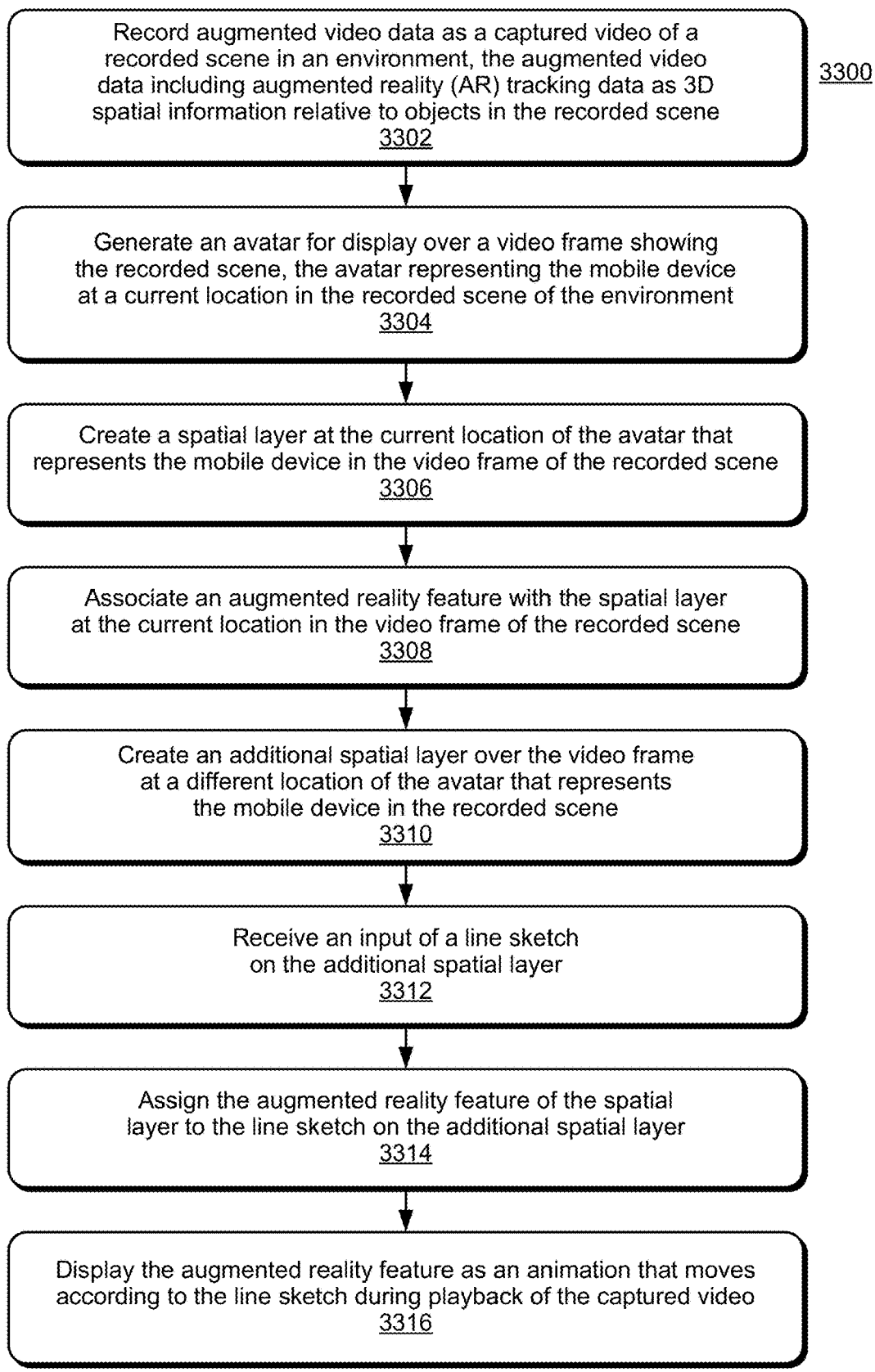

FIG. 33 illustrates example method(s) 3300 for augmented video prototyping, and is generally described with reference to the video prototyping module implemented by a computing device as shown and described with reference to FIGS. 1-29. The order in which the method is described is not intended to be construed as a limitation, and any number or combination of the method operations can be combined in any order to implement a method, or an alternate method.

At 3302, augmented video data is recorded as a captured video of a recorded scene in an environment, the augmented video data including augmented reality (AR) tracking data as 3D spatial information relative to objects in the recorded scene. For example, the mobile device 102 includes the camera device 112 that can be used to record the augmented video data 114 as the captured video 116 of the recorded scene 118 in the example environment 100. The augmented video data 114 includes the augmented reality (AR) tracking data 126 as 3D spatial information relative to the objects 120 in the captured video 116 of the recorded scene 118, as well as relative to the position of the camera device 112 (i.e., in the mobile device 102) while the augmented video data 114 is being recorded.

At 3304, an avatar is generated for display over a video frame showing the recorded scene, the avatar representing the mobile device at a current location from the perspective of the recorded scene of the environment. For example, the video prototyping module 104 implemented by the mobile device 102 can generate the avatar 136 as a representation of the mobile device 102, which can be displayed in the recorded scene of the captured video. The avatar 136 is a visualization of the current position of the mobile device 102 in the environment 100 as the user moves the mobile device around in the environment after the captured video 116 is recorded.

At 3306, a spatial layer is created at the current location of the avatar that represents the mobile device in the video frame of the recorded scene, the spatial layer localized with reference to the objects in the video frame of the recorded scene using the 3D spatial information. For example, the video prototyping module 104 implemented by the mobile device 102 can create the spatial layer 138 at the current location of the avatar 136 that represents the mobile device 102 in a video frame 124 of the recorded scene 118. The spatial layer 138 is an interactive interface on which to create an augmented reality feature 140 that displays during playback of the captured video 116, and a spatial layer 138 can be localized with reference to the objects 120 in the video frame 124 of the recorded scene 118 using the 3D spatial information in the AR tracking data 126.

At 3308, an augmented reality feature is associated with the spatial layer at the current location in the video frame of the recorded scene. For example, the video prototyping module 104 implemented by the mobile device 102 can associate an augmented reality feature 140, such as any type of a sketch, image, animation, 3D model, etc. with the spatial layer 138 that is created at the current location of the avatar 136 that represents the mobile device 102 in a video frame 124 of the recorded scene 118.

At 3310, an additional spatial layer is created over the video frame at a different location of the avatar that represents the mobile device in the recorded scene. For example, the video prototyping module 104 implemented by the mobile device 102 can create the additional spatial layer 2402 at a different location of the avatar 136 that represents the mobile device 102 in the recorded scene.

At 3312, an input of a motion path sketch is received on the additional spatial layer, and at 3314, an augmented reality feature of the spatial layer is assigned to the motion path sketch on the additional spatial layer. For example, the video prototyping module 104 implemented by the mobile device 102 can receive an input of the motion path sketch 2404 on the additional spatial layer 2402, as drawn by the user of the mobile device 102, and the augmented reality feature 140 of the spatial layer 138 can then be assigned to the motion path sketch 2404 on the additional spatial layer 2402.

At 3316, the augmented reality feature is displayed as an animation that moves according to the motion path sketch during playback of the captured video. For example, the video prototyping module 104 implemented by the mobile device 102 initiates the augmented reality feature 140 to display as an animation that moves according to the motion path sketch 2404 during playback of the corresponding video frames 124 of the captured video 116. The enactment of the additional spatial layer 2402 is assigned to the selected spatial layer 138 to animate the augmented reality feature 140.

Figure 34:
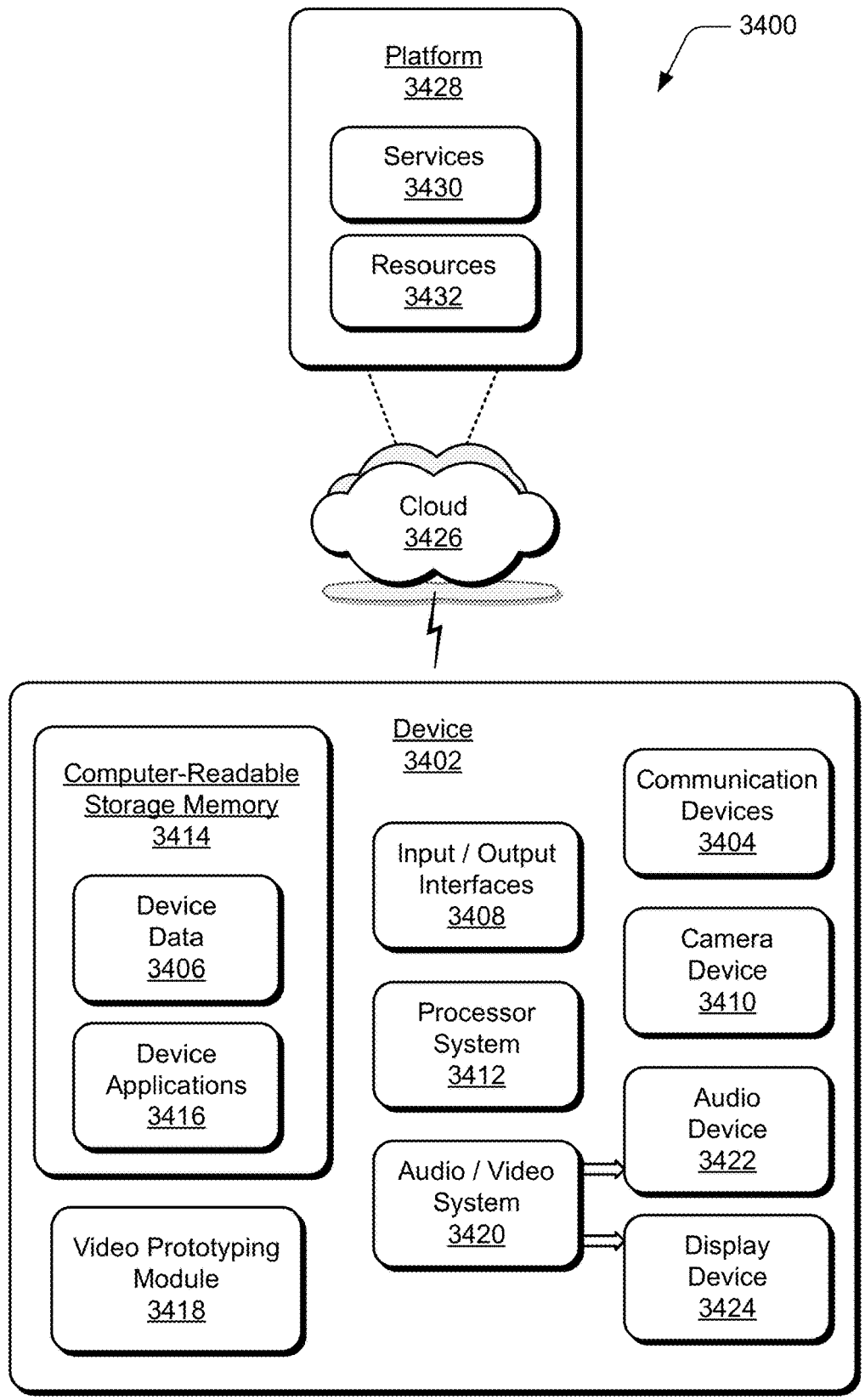
FIG. 34 illustrates an example system with an example device that can implement aspects of augmented video prototyping.

FIG. 34 illustrates an example system 3400 that includes an example device 3402, which can implement techniques of augmented video prototyping. The example device 3402 can be implemented as any of the computing devices, mobile devices, server devices, and/or services described with reference to the previous FIGS. 1-33, such as any type of computing device, client device, mobile phone, tablet, communication, entertainment, gaming, media playback, and/or other type of device. For example, the mobile device 102 may be implemented as the example device 3402.

The example device 3402 includes communication devices 3404 that enable wired and/or wireless communication of device data 3406, such as any of the augmented video data, AR tracking data, video frames, sensor data, as well as computer applications data and content that is transferred from one computing device to another, and/or synched between multiple computing devices. The device data 3406 can include any type of audio, video, image, and/or graphic data that is generated by applications executing on the device. The communication devices 3404 can also include transceivers for cellular phone communication and/or for network data communication.

The device 3402 also includes input/output (I/O) interfaces 3408, such as data network interfaces that provide connection and/or communication links between the device, data networks, and other devices. The I/O interfaces can be used to couple the device to any type of components, peripherals, and/or accessory devices, such as a digital camera device 3410 and/or computer input device that may be integrated with the example device 3402. The I/O interfaces also include data input ports via which any type of data, media content, and/or inputs can be received, such as user inputs to the device, as well as any type of audio, video, and/or image data received from any content and/or data source.

The device 3402 includes a processor system 3412 that may be implemented at least partially in hardware, such as with any type of microprocessors, controllers, and the like that process executable instructions. The processor system 3412 can include components of an integrated circuit, programmable logic device, a logic device formed using one or more semiconductors, and other implementations in silicon and/or hardware, such as a processor and memory system implemented as a system-on-chip (SoC). Alternatively or in addition, the device 3402 can be implemented with any one or combination of software, hardware, firmware, or fixed logic circuitry that may be implemented with processing and control circuits. The device 3402 may further include any type of a system bus or other data and command transfer system that couples the various components within the device. A system bus can include any one or combination of different bus structures and architectures, as well as control and data lines.

The example device 3402 also includes computer-readable storage memory 3414, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory 3414 can include various implementations of random access memory (RAM), read-only memory (ROM), flash memory, and other types of storage memory in various memory device configurations.

The computer-readable storage memory 3414 provides storage of the device data 3406 and various device applications 3416, such as an operating system that is maintained as a software application with the computer-readable storage memory and executed by the processor system 3412. In this example, the device 3402 includes a video prototyping module 3418 that implements the described techniques of augmented video prototyping, and may be implemented with hardware components and/or in software as one of the device applications 3416, such as when the example device 3402 is implemented as the mobile device 102 shown and described with reference to FIGS. 1-33. An example of the video prototyping module 3418 includes the video prototyping module 104 that is implemented as a software application and/or as hardware components by the mobile device 102 as described with reference to FIGS. 1-33. In implementations, the video prototyping module 3418 may include independent processing, memory, and logic components as a computing and/or electronic device integrated with the device 3402.

The device 3402 also includes an audio and/or video system 3420 that generates audio data for an audio device 3422 and/or generates display data for a display device 3424. The audio device and/or the display device include any devices that process, display, and/or otherwise render audio, video, display, and/or image data. In implementations, the audio device and/or the display device are integrated components of the example device 3402. Alternatively, the audio device and/or the display device are external, peripheral components to the example device. In embodiments, at least part of the techniques described for augmented video prototyping may be implemented in a distributed system, such as over a "cloud" 3426 in a platform 3428. The cloud 3426 includes and/or is representative of the platform 3428 for services 3430 and/or resources 3432.

The platform 3428 abstracts underlying functionality of hardware, such as server devices (e.g., included in the services 3430) and/or software resources (e.g., included as the resources 3432), and connects the example device 3402 with other devices, servers, etc. The resources 3432 may also include applications and/or data that can be utilized while computer processing is executed on servers that are remote from the example device 3402. Additionally, the services 3430 and/or the resources 3432 may facilitate subscriber network services, such as over the Internet, a cellular network, or Wi-Fi network. The platform 3428 may also serve to abstract and scale resources to service a demand for the resources 3432 that are implemented via the platform, such as in an interconnected device embodiment with functionality distributed throughout the system 3400. For example, the functionality may be implemented in part at the example device 3402 as well as via the platform 3428 that abstracts the functionality of the cloud 3426.

Although implementations of augmented video prototyping have been described in language specific to features and/or methods, the appended claims are not necessarily limited to the specific features or methods described. Rather, the specific features and methods are disclosed as example implementations of augmented video prototyping, and other equivalent features and methods are intended to be within the scope of the appended claims. Further, various different examples are described and it is to be appreciated that each described example can be implemented independently or in connection with one or more other described examples.

The invention claimed is:

1. A mobile device implemented for augmented video prototyping, the mobile device comprising:
 a camera device to record augmented video data as a captured video of a recorded scene in an environment, the augmented video data including augmented reality (AR) tracking data as 3D spatial information relative to objects in the recorded scene;
 a display device to display video frames of the captured video showing the recorded scene in the environment;
 a video prototyping module implemented at least partially in computer hardware, the video prototyping module configured to:
  localize the mobile device with reference to the objects in the recorded scene of the environment using the 3D spatial information responsive to the mobile device being within boundaries of the recorded scene in the environment; and
  generate an avatar for display over a video frame showing the recorded scene, the avatar representing the mobile device at a current location from a perspective of the recorded scene of the environment.

2. The mobile device as recited in claim 1, wherein the video prototyping module is configured to create a spatial layer over the video frame at the current location of the avatar that represents the mobile device in the recorded scene of the environment, the spatial layer localized with reference to the objects in the recorded scene using the 3D spatial information.

3. The mobile device as recited in claim 2, wherein the spatial layer is an interactive interface on which to create an augmented reality feature that displays during playback of the captured video, the augmented reality feature including at least one of a sketch, an image, an animation, or a 3D model.

4. The mobile device as recited in claim 3, wherein the video prototyping module is configured to record animation actions as movements of the spatial layer, and the animation actions are applied to the augmented reality feature that displays as an animation during playback of the captured video.

5. The mobile device as recited in claim 3, wherein the spatial layer is mapped to one or more of the video frames of the captured video, and the augmented reality feature displays as an animation during playback of the captured video.

6. The mobile device as recited in claim 3, wherein the video prototyping module is configured to create spatial layer timing and positioning of the augmented reality feature that displays during playback of the captured video.

7. The mobile device as recited in claim 3, wherein the video prototyping module is configured to:
  associate the avatar that represents the mobile device with the spatial layer;
  move the spatial layer along a motion path according to movements of the mobile device for a 3D manipulation of the augmented reality feature; and
  the augmented reality feature displays as an animation that moves according to the 3D manipulation during playback of the captured video.

8. The mobile device as recited in claim 2, wherein the video prototyping module is configured to:
  create an additional spatial layer over the video frame at a different location of the avatar that represents the mobile device in the recorded scene;
  receive an input of a motion path sketch on the additional spatial layer;
  assign an augmented reality feature of the spatial layer to the motion path sketch on the additional spatial layer; and
  the augmented reality feature displays as an animation that moves according to the motion path sketch during playback of the captured video.

9. The mobile device as recited in claim 1, wherein the video prototyping module is configured to track relative locations in the video frames of the mobile device in the recorded scene of the environment using the 3D spatial information as the video frames are displayed, and the avatar is displayable over the video frames to represent the mobile device at respective locations in the recorded scene of the environment.

10. In a digital medium environment for augmented video prototyping, a method implemented by a mobile device, the method comprising:
  recording augmented video data as a captured video of a recorded scene in an environment, the augmented video data including augmented reality (AR) tracking data as 3D spatial information relative to objects in the recorded scene;
  displaying video frames of the captured video showing the recorded scene in the environment;
  localizing the mobile device with reference to the objects in the recorded scene of the environment using the 3D spatial information responsive to the mobile device being within boundaries of the recorded scene in the environment; and
  generating an avatar for display over a video frame showing the recorded scene, the avatar representing the mobile device at a current location from a perspective of the recorded scene of the environment.

11. The method as recited in claim 10, further comprising:
  creating a spatial layer over the video frame at the current location of the avatar that represents the mobile device in the recorded scene of the environment, the spatial layer localized with reference to the objects in the recorded scene using the 3D spatial information.

12. The method as recited in claim 11, wherein the spatial layer is an interactive interface on which to create an augmented reality feature that displays during playback of the captured video.

13. The method as recited in claim 12, further comprising:
  recording animation actions as movements of the spatial layer, and the animation actions applied to the augmented reality feature that displays as an animation during playback of the captured video.

14. The method as recited in claim 12, further comprising:
  mapping the spatial layer to one or more of the video frames of the captured video, and the augmented reality feature displaying as an animation during playback of the captured video.

15. The method as recited in claim 12, further comprising:
  creating spatial layer timing and positioning of the augmented reality feature that displays during playback of the captured video.

16. The method as recited in claim 12, further comprising:
  associating the avatar that represents the mobile device with the spatial layer;
  moving the spatial layer along a motion path according to movements of the mobile device for a 3D manipulation of the augmented reality feature; and
  displaying the augmented reality feature as an animation that moves according to the 3D manipulation during playback of the captured video.

17. The method as recited in claim 12, further comprising:
  creating an additional spatial layer over the video frame at a different location of the avatar that represents the mobile device in the recorded scene;
  receiving an input of a motion path sketch on the additional spatial layer;
  assigning an augmented reality feature of the spatial layer to the motion path sketch on the additional spatial layer; and
  displaying the augmented reality feature as an animation that moves according to the motion path sketch during playback of the captured video.

18. The method as recited in claim 12, further comprising:
  tracking relative locations in the video frames of the mobile device in the recorded scene of the environment using the 3D spatial information as the video frames are displayed; and
  displaying the avatar over the video frames to represent the mobile device at respective locations in the recorded scene of the environment.

19. A mobile device implemented for augmented video prototyping, the mobile device comprising:
  a camera device to record augmented video data as a captured video of a recorded scene in an environment, the augmented video data including augmented reality (AR) tracking data as 3D spatial information relative to objects in the scene;
  a video prototyping module implemented at least partially in computer hardware, the video prototyping module configured to:
    localize the mobile device with reference to the objects in the recorded scene of the environment using the 3D spatial information responsive to the mobile device being within boundaries of the recorded scene in the environment; and
    create a spatial layer over a video frame at a current location of an avatar that represents the mobile device in the recorded scene of the environment, the spatial layer localized with reference to the objects in the recorded scene and the spatial layer is an interactive interface on which to create an augmented reality feature that displays during playback of the captured video.

20. The mobile device as recited in claim 19, wherein the video prototyping module is configured to:
- record animation actions as movements of the spatial layer, the animation actions applied to the augmented reality feature;
- map timing and positioning of the spatial layer to one or more of the video frames of the captured video; and
- the augmented reality feature is displayable as an animation during playback of the captured video.

* * * * *